US011449354B2

(12) United States Patent
Fu et al.

(10) Patent No.: US 11,449,354 B2
(45) Date of Patent: Sep. 20, 2022

(54) APPARATUS, SYSTEMS, AND METHODS FOR COMPOSABLE DISTRIBUTED COMPUTING

(71) Applicant: Spectro Cloud, Inc., Cupertino, CA (US)

(72) Inventors: Tianying Fu, Cupertino, CA (US);
Saad Malik, San Jose, CA (US);
Gautam Joshi, San Jose, CA (US)

(73) Assignee: Spectro Cloud, Inc., Cupertino, CA (US)

( * ) Notice: Subject to any disclaimer, the term of this patent is extended or adjusted under 35 U.S.C. 154(b) by 58 days.

(21) Appl. No.: 16/746,802

(22) Filed: Jan. 17, 2020

(65) Prior Publication Data

US 2021/0224093 A1     Jul. 22, 2021

(51) Int. Cl.
*G06F 9/455*     (2018.01)

(52) U.S. Cl.
CPC ...... *G06F 9/45558* (2013.01); *G06F 9/45541* (2013.01); *G06F 2009/4557* (2013.01); *G06F 2009/45595* (2013.01)

(58) Field of Classification Search
CPC ............ G06F 9/45558; G06F 9/45541; G06F 2009/45595; G06F 2009/4557
See application file for complete search history.

(56) References Cited

U.S. PATENT DOCUMENTS

| | | | | |
|---|---|---|---|---|
| 2006/0136490 | A1* | 6/2006 | Aggarwal | .............. G06Q 10/06 |
| 2011/0173303 | A1* | 7/2011 | Rider | ................... G06F 9/44505 709/220 |
| 2016/0285957 | A1* | 9/2016 | Haserodt | ............. H04L 67/1097 |
| 2017/0257432 | A1* | 9/2017 | Fu | ........................ H04L 67/2823 |
| 2020/0073656 | A1* | 3/2020 | Satapathy | ........... G06F 11/0766 |

* cited by examiner

*Primary Examiner* — Dong U Kim
(74) *Attorney, Agent, or Firm* — Silicon Valley Patent Group LLP; Thomas C. Chan

(57) ABSTRACT

Embodiments disclosed facilitate specification, configuration, orchestration, deployment, and management of composable distributed systems. A method to realize a composable distributed system may comprise: determining, based on a system composition specification for the distributed system, one or more cluster configurations, wherein the system composition specification comprises, for each cluster, a corresponding cluster specification and a corresponding cluster profile, which may comprise a corresponding software stack specification. First software stack images applicable to a first plurality of nodes in a first cluster may be obtained based on a corresponding first software stack specification, which may be comprised in a first cluster profile associated with the first cluster. Deployment of the first cluster may be initiated by instantiating the first cluster in a first cluster configuration in accordance with a corresponding first cluster specification, wherein each of the first plurality of nodes is instantiated using the corresponding first software stack images.

25 Claims, 16 Drawing Sheets

150

```
{
  "packs":[
    {                                                          106
      "layer":"os"
      "pack":"Ubuntu Core 18",
      "file":"ubuntu-18.04.03.bin"
      "env":null
        "adapter":"Flash-bin-to-system-partition",
        "parameters" : {
                "ClusterProfile_builder": {
                ...
                },
        },
    }
    {                                                          111
      "layer":"kernel",
      "pack":"Vmkernel-4.2-secure",
      "file":"Vmkernel-4.2-secure.bin",
      "adapter":"Flash-bin-to-system-partition"
      "env":null
      "parameters" : {
              "ClusterProfile": {
              ...
              },
      }.
    },
    {                                                          116
      "layer":"orchestrator",
      "pack":"Kubernetes-1.15",
      "file":"Kubernetes-1.15.2.bin",
      "adapter":"write_file_to_disk"
      "env":null
      "parameters":{
        "enableVault":true
      }
```

(From FIG. 1C)

104

```
{
  "layer":"Networking"
  "pack":"Calico",
  "file":"<repo>/calico.tar.gz"
  "env":null
    "adapter":"helm . . . ",
    "parameters" : {
           "ClusterProfile_builder": {
              . . .
              },
        },
}
```
121

```
{
  "layer":"Storage",
  "pack":"OpenEBS",
  "File": "<repo>/OpenEBS",
  "adapter":"helm . . ."
  "env":null
  "parameters" : {
           "ClusterProfile_builder": {
              . . .
              },
      }.
},
```
126

```
{
  "layer":"Security",
  "pack":"Enable selinux",
  "file":"",
  "adapter":"$!/bin/bash . . ."
  "env":null
  "parameters":{
    "enableVault":true
  }
```
131

APPARATUS, SYSTEMS, AND METHODS FOR COMPOSABLE DISTRIBUTED COMPUTING

BACKGROUND

Field of the Invention

The present invention relates to the field of distributed computing and in particular, to apparatus, systems, and methods to facilitate flexible composition, management, and deployment distributed computing systems and applications.

Description of Related Art

Compute performance can be enhanced by distributing applications across a computer network. The emergence of virtualization technologies have facilitated distributed computation by treating the underlying compute resources as units that may be allocated and scaled according to application and/or user demand. The terms "cloud" or "cloud infrastructure" refer to a group of networked computers with (hardware and/or software) support for virtualization. A virtual machine (VM) or node may be viewed as some fraction of the underlying resources provided by the cloud. Typically, each VM may run an Operating System (OS), which can contribute to computational and resource overhead. In a large system, where several VMs are instantiated, the overhead can be substantial and lead to resource utilization inefficiencies. Containerized applications or containers, which may take the form of compartmentalized applications that can be isolated from each other, may run on a single VM and its associated OS. Containers may viewed as including two parts—(i) a container image that includes the application, binaries, libraries and data to run the container, and (ii) OS features that isolate one or more running processes from other running processes. Thus, containers can be used to run multiple workloads on a single VM thereby facilitating quicker deployment while improving cloud resource utilization efficiencies. The availability of cloud resources (e.g. over the Internet) on demand, relatively low overall costs, as well as techniques that enhance cloud resource utilization efficiencies (e.g. via container use) have enabled the migration of many applications and services that are typically run on traditional computing systems to cloud based systems.

However, applications that demand specialized hardware capabilities and/or custom software resources to run application workloads often face challenges when migrating to the cloud. For example, systems where containers are run on physical hardware directly often demand extensive customization, which, in conventional schemes, can be difficult, expensive to develop and maintain, and limit flexibility and scalability. In some situations, applications may use graphics hardware (e.g. graphical processing units or GPUs), tensor processing units (TPUs), and/or specialized libraries and/or software stacks. Such specialized hardware capabilities and/or software stacks may not be easily available and/or configurable in a distributed (e.g. cloud based) environment thereby limiting application deployment and migration.

Moreover, even in systems where container based applications are run on VM clusters, the process of provisioning and managing the software stack can be disjoint and error-prone because of software/version incompatibilities and/or other manual configuration errors. For example, an application provider may seek to isolate one group of containers (e.g. highly trusted and/or sensitive applications) on one cluster, while running other containers (e.g. less trusted/less sensitive) on a different cluster. In practice, such operational parameters can lead to an increase distributed application deployment complexity, and/or decrease resource utilization/performance, and/or result in deployment errors (e.g. due to the complexity) that may expose the application to unwanted risks (e.g. security risks).

Thus, many applications often continue to run on traditional on-site platforms. Moreover, even in situations when cloud based resources are partially used to run the above applications, such systems may demand extensive manual intervention for set up, deployment, provisioning, and/or management, which can be expensive, impractical, and error-prone. Because of the wide variety of applications and the desired capabilities to run applications—apparatus, systems, and automated methods for: (a) composing distributed systems (including cloud based systems) and (b) deploying, provisioning, and managing such systems may be advantageous.

SUMMARY

In some embodiments, a processor-implemented method to realize a composable distributed computing system comprising one or more clusters may comprise: determining, based on a system composition specification for the composable distributed computing system, one or more cluster configurations, wherein the system composition specification comprises, for each cluster of the one or more clusters, a corresponding cluster specification and a corresponding cluster profile, wherein each cluster profile comprises a corresponding software stack specification; obtaining, based on a first software stack specification corresponding to a first cluster in the one or more clusters, corresponding first software stack images applicable to a first plurality of nodes in the first cluster, wherein the first software stack specification is comprised in a first cluster profile associated with the first cluster; and initiating deployment of the first cluster by instantiating the first cluster in a first cluster configuration in accordance with a corresponding first cluster specification, wherein the first cluster configuration is comprised in the one or more cluster configurations, and wherein each of the first plurality of nodes is instantiated using the corresponding first software stack images.

In another aspect, a computer system may comprise a processor coupled to a memory and a network interface, wherein the processor is configured to: determine, based on a system composition specification for a composable distributed computing system, one or more cluster configurations, wherein the system composition specification comprises, for each cluster of one or more clusters, a corresponding cluster specification and a corresponding cluster profile, wherein each cluster profile comprises a corresponding software stack specification; obtain, based on a first software stack specification corresponding to a first cluster in the one or more clusters, corresponding first software stack images applicable to a first plurality of nodes in the first cluster, wherein the first software stack specification is comprised in a first cluster profile associated with the first cluster; and initiate deployment of the first cluster by instantiating the first cluster in a first cluster configuration in accordance with a corresponding first cluster specification, wherein the first cluster configuration is comprised in the one or more cluster configurations, and wherein each of the first plurality of nodes is instantiated using the corresponding first software stack images.

Some disclosed embodiments also pertain to a non-transitory computer-readable medium comprising instructions to configure a processor to: determine, based on a system composition specification for a composable distributed computing system, one or more cluster configurations, wherein the system composition specification comprises, for each cluster of one or more clusters, a corresponding cluster specification and a corresponding cluster profile, wherein each cluster profile comprises a corresponding software stack specification; obtain, based on a first software stack specification corresponding to a first cluster in the one or more clusters, corresponding first software stack images applicable to a first plurality of nodes in the first cluster, wherein the first software stack specification is comprised in a first cluster profile associated with the first cluster; and initiate deployment of the first cluster by instantiating the first cluster in a first cluster configuration in accordance with a corresponding first cluster specification, wherein the first cluster configuration is comprised in the one or more cluster configurations, and wherein each of the first plurality of nodes is instantiated using the corresponding first software stack images.

Consistent with embodiments disclosed herein, various exemplary apparatus, systems, and methods for facilitating the orchestration and deployment of cloud-based applications are described. Embodiments also relate to software, firmware, and program instructions created, stored, accessed, or modified by processors using computer-readable media or computer-readable memory. The methods described may be performed on processors, various types of computers, and computing systems—including distributed computing systems such as clouds. The methods disclosed may also be embodied on computer-readable media, including removable media and non-transitory computer readable media, such as, but not limited to optical, solid state, and/or magnetic media or variations thereof and may be read and executed by processors, computers and/or other devices.

These and other embodiments are further explained below with respect to the following figures.

BRIEF DESCRIPTION OF THE DRAWINGS

FIGS. 1C and 1D shows an example declarative cluster profile definition in accordance with disclosed embodiments.

Figure 1A:
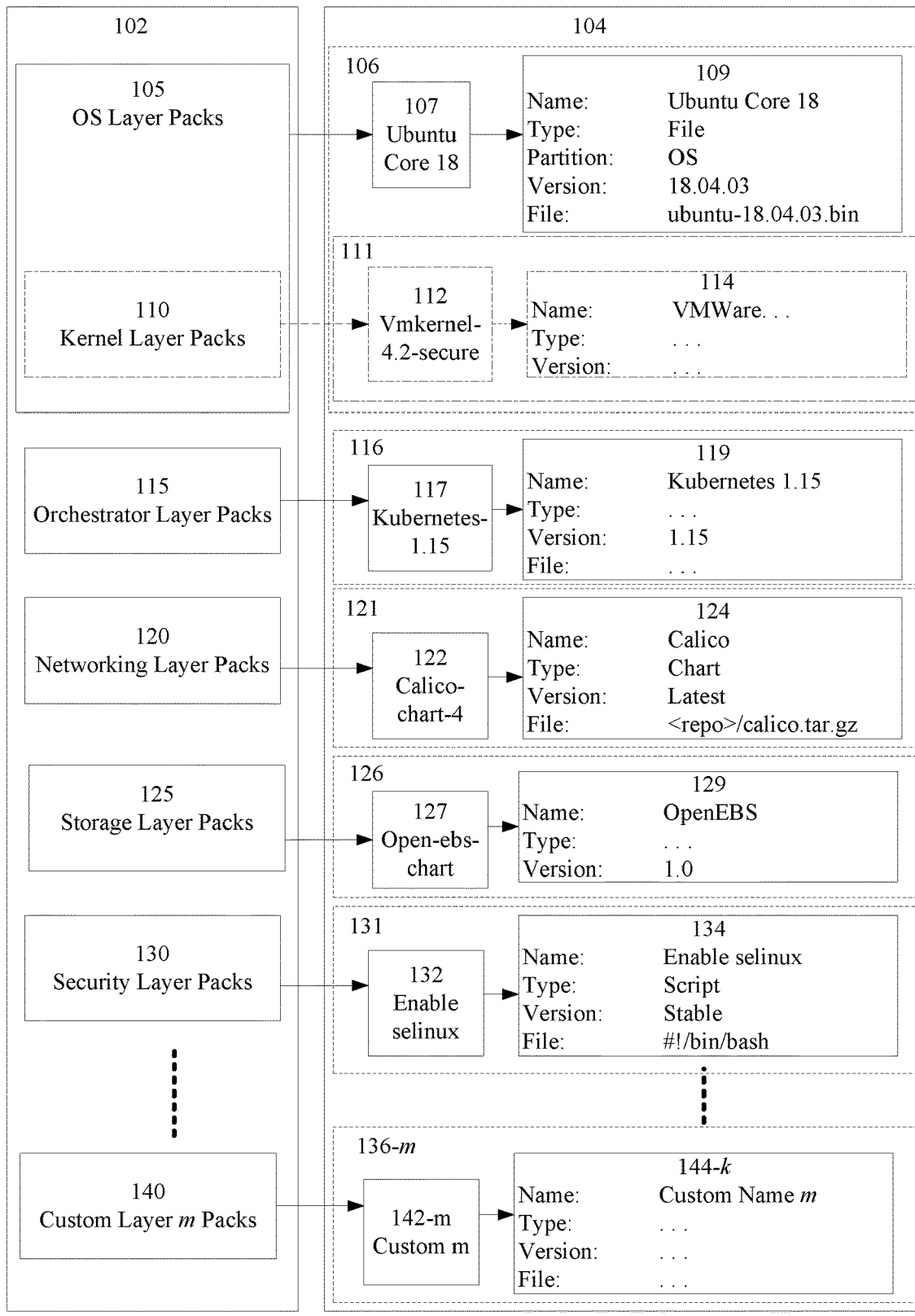
FIGS. 1A and 1B show example approaches for illustrating a portion of a specification of a composable distributed system.

Like reference numbers and symbols in the various figures indicate like elements, in accordance with certain example embodiments. In addition, multiple instances of an element may be indicated by following a first number for the element with a letter or with a hyphen and a second number, and/or a subscript and/or a superscript. For example, multiple instances of an element 104 may be indicated as 104-1, 104-2, 104-N etc. When referring to such an element using only the first number, any instance of the element is to be understood (e.g. element 104 in the previous example would refer to elements 104-1, 104-2, and/or 104-N).

DETAILED DESCRIPTION

Some disclosed embodiments pertain to apparatus, systems, and methods to facilitate specification and deployment of composable end-to-end distributed systems. Apparatus and techniques for the configuration, orchestration, deployment, and management of composable distributed systems and applications are also described.

The term "composable" refers to the capability to architect, build, and deploy customizable systems flexibly based on an underlying pool of resources (including hardware and/or software resources). The term end-to-end indicates that the composable aspects can apply to the entire system (e.g. both hardware and software and to each cluster (or composable unit) that forms part of the system). For example, the resource pool may include various hardware types, several operating systems, as well as orchestration, networking, storage, and/or load balancing options, and/or custom (e.g. user provided) resources. A composable distributed system specification may identify subsets of the above resources and detail, for each subset, a corresponding configuration of the resources in the subset, which may be used to realize (e.g. deploy and instantiate) and manage (e.g. monitor and reconcile) the specified (composable) distributed system. Thus, the composable distributed system may be some specified synthesis of resources (e.g. from the resource pool) and a configuration of those resources. In some embodiments, resources in the resource pool may be selected and configured in order to specify the composable system as outlined herein. Composability, as used herein, also refers to the declarative nature of the system composition specification, which may directed to the composition (or configuration) of the desired distributed system and the state of the desired distributed system rather than focusing on the steps, procedures, and mechanics of how the distributed system is put together. In some embodiments, the desired composition and/or state of the (composable) distributed system may be altered by simply by changing parameters associated with the system composition specification and the specified changes may be automatically implemented as outlined further herein. As an example, because different providers (e.g. cloud providers) may have different procedures/mechanics etc. to implement similar distributed systems, composability frees the user from the mechanics of realizing a desired distributed system and facilitates user focus on the composition and state of desired distributed system without regard to the provider (e.g. whether Amazon or Google Cloud) or the mechanics involved.

For example, resources from the resource pool may be selected and flexibly configured to build the system to match user and/or application specifications at some point in time. In some embodiments, resources from the resource pool may be individually selected, provisioned, scaled, and/or aggregated/disaggregated to match user/application requirements. Aggregation refers to the combining of one or more resources (e.g. memory) so that they may be reside on a smaller subset of nodes (e.g. on a single server) on the distributed system. Disaggregation refers to the distribution of resources (e.g. memory) so that the resource is split between (e.g. distributed across) nodes in the distributed system. For example, when the resource is memory, disaggregation may result in distributing shared memory on a single server to one or more nodes in the distributed system. In composable distributed systems disclosed herein, equivalent resources from the resource pool may be swapped or changed without compromising overall functionality of the composable system. In addition, new resources from the pool may be added and/or existing resources may be updated to enhance system functionality transparently.

Some disclosed embodiments facilitate provisioning and management of end-to-end composable systems and platforms using declarative models. Declarative models facilitate system specification and implementation based on a declared (or desired) state. The specification of composable systems using declarative models facilitates both realization of a desired distributed system (e.g. as specified by a user) and in maintenance of the composition and state of the system (e.g. during operation). Thus, a change in the composition (e.g. change to the specification of the composable system) may result in the change being applied to the composable system (e.g. via the declarative model implementation). Conversely, a deviation from the specified composition (e.g. from failures or errors associated with one or more components of the system) may result in remedial measures being applied so that system compliance with the composed system specification is maintained. In some embodiments, during system operation, the composition and state of the composable distributed system may be monitored and brought into compliance with the specified composition (e.g. as specified or updated) and/or declared state (e.g. as specified or updated).

The term distributed computing, as used herein, refers to the distribution of computing applications across a networked computing infrastructure, including clouds and other virtualized infrastructures. The term cloud refers to virtualized computing resources, which may be scaled up or down in response to computing demands and/or user requests. Cloud computing resources are built over underlying physical hardware including processors, memory, storage, networking, and a software stack, which may be made available as virtual machines (VMs). A VM or virtual node refers to a computer based on configured cloud computing resources (e.g. with processing, memory, storage, networking, and an OS) that may be used to run applications. The term node may refer to a physical computer (physical node) or a VM (virtual node) associated with a distributed system. A cluster is a collection of VMs or nodes that may be interlinked and/or shared and used to run applications.

When the cloud infrastructure is made available (e.g. over a network such as the Internet) to users, the cloud infrastructure is often referred to as Infrastructure as a Service (IaaS). IaaS infrastructure is typically managed by the provider. In the Platform-as-a-Service (PaaS) model, cloud providers may supply a platform, (e.g. with a preconfigured software stack) upon which customers may run applications. PaaS providers typically manage the platform (infrastructure and software stack), while the application run-time/execution environment may be user-managed. Software-as-a-Service (SaaS) models provide ready to use software applications such as financial or business applications for customer use. SaaS providers may manage the cloud infrastructure, any software stacks, and the ready to use applications, while users may retain control of data and tailor application configuration as appropriate.

The term "container" or "application container" as used herein, refers to an isolation unit or environment within a single operating system and may be specific to a running program. When executed in their respective containers, the programs may run sandboxed on a single VM. Sandboxing may depend on OS virtualization features, such as namespaces. OS virtualization facilitates rebooting, provision of IP addresses, memory, processes etc. to the respective containers. Containers may take the form of a package (e.g. an image), which may include the application, application dependencies (e.g. services used by the application), the application's runtime environment (e.g. environment variables, privileges etc.), application libraries, other executables, and configuration files. One distinction between an application container and a VM is that multiple application containers (e.g. each corresponding to a different application) may be deployed over a single OS, whereas, each VM typically runs a separate OS. Thus, containers are often less resource intensive and may facilitate better utilization of underlying host hardware resources. Providers may also deliver container cluster management, container orchestration, and the underlying computational resources to end-users as a service, which is referred to as "Container as a Service" (CaaS).

However, containers may create additional layers of complexity. For example, applications may use multiple containers, which can potentially be deployed across multiple servers based on various system parameters. Thus, container operation and deployment can be complex. To ensure proper deployment, realize resource utilization efficiencies, and optimal run time performance, containers are orchestrated. Orchestration refers to the coordination of tasks associated with a distributed system/distributed applications including instantiation, task sequencing, task scheduling, task distribution, scaling, etc. Orchestration may involve various resources associated with the distributed system including infrastructure, software, and/or services. In general, application deployment may depend on various operational parameters including orchestration (e.g. for cloud-native applications), availability, resource management, persistence, performance, scalability, networking, security, monitoring, etc. These operational parameters may also apply to containers. Accordingly, the use and deployment of containers may also involve extensive customization to ensure compliance with operational parameters. In many instances, to facilitate compliance, containers may be deployed along with VMs or over physical hardware. For example, an application provider may seek to isolate one group of containers (e.g. highly trusted and/or sensitive applications) on one VM (or cluster) while running other containers (e.g. less trusted/less sensitive) on a different cluster. In practice, such operational parameters can lead to an increase distributed application deployment complexity, and/or decrease resource utilization/performance, and/or result in deployment errors (e.g. due to the complexity) that may expose the application to unwanted risks (e.g. security risks).

In some instances, distributed applications, which may be container based applications, may use specialized hardware resources (e.g. graphics processors), which may not be easily available on public clouds. Such systems, where containers are run on physical hardware directly, often demand extensive customization, which, in conventional schemes, can be difficult, expensive to develop and maintain, and limit flexibility and scalability.

Further, in conventional systems, the process of provisioning and managing the OS and orchestrator (e.g. Kubernetes or "K8s") can be disjoint and error-prone. For example, orchestrator (e.g. K8s) versions may not be compatible with the OS (e.g. CentOS) versions associated with a VM. As another example, specific OS configurations or tweaks, which may facilitate better operational efficiency for an application, may be misconfigured or omitted thereby affecting application deployment, execution, and/or performance. Moreover, one or more first resources (e.g. a load balancer) may depend on a second resource and/or be incompatible with a third resource. Such dependencies and/or incompatibilities may further complicate system specification, provisioning, orchestration, and/or deployment. Further, even in situations where a system has been appropriately configured, the application developer may desire additional customization options that may not be available or made available by a provider and/or depend on manual configuration to integrate with provider resources.

In addition, to the extent that declarative options are available to a container orchestrator (e.g. K8s) in conventional systems, maintaining consistency with declared options is limited to container objects (or to entire VMs that run the containers), but the specification of declarative options at lower levels of granularity are unavailable. Moreover, in conventional systems, the declarative aspects do not apply to system composition—merely to the maintenance of declared states of container objects/VMs. Thus, specification, provisioning, and maintenance of conventional systems may involve manual supervision, be time consuming, inefficient, and subject to errors. Moreover, in conventional systems, upgrades are often effected separately for each component (i.e. on a per component basis) and automatic multi-component/system-wide upgrades are not supported. In addition, for distributed systems with multiple (e.g. K8s) clusters, then, in addition to the issues described above, manual configuration and/or upgrades may result in unintended configuration drifts between clusters.

Some disclosed embodiments pertain to the specification of an end-to-end composable distributed system (including infrastructure, software, services, etc.), which may be used to facilitate automatic configuration, orchestration, deployment, monitoring, and management of the distributed computing system transparently. The term end-to-end indicates that the composable aspects apply to the entire system. For example, a system may be viewed as comprising of a plurality of layers that leverage functionality provided by lower level layers. These layers may comprise: a machine/VM layer, a host OS layer, a guest OS/kernel layer, an orchestration layer, a networking layer, a security layer, one more application or user defined layers, etc. Disclosed composable end-to-end system embodiments may facilitate both: (a) user definition of the layers and (b) specification of components/resources associated with each layer. In some embodiments, the specification of layers and/or the specification of components/resources associated with each layer may be cluster-specific. For example, a first cluster may be specified as being composed with a configuration (e.g. layers and layer components) that is different from the configuration associated with one or more second clusters. In some embodiments, a first plurality of clusters may be specified as sharing a first configuration, while a second plurality of cluster may be specified as sharing a second configuration different from the first configuration. The end-to-end composed distributed system, as composed/tailored by the user, may be orchestrated, deployed, monitored, and managed based on the specified composition and state.

For example, in some embodiments, the specified composition may be implemented using a declarative model, which may reconcile a current (or deployed) composition of the distributed system with the specified composition. For example, a load balancing layer/load balancing component specified as part of the composition of the distributed system may be initiated (if not yet started) or re-started (e.g. if the load balancing component has failed or has exited with errors). In some embodiments, the declarative model may further reconcile an existing state of the distributed system with the declared state. For example, if the number of nodes in a cluster does not correspond to a specified number of nodes, then nodes may be started or stopped as appropriate.

Deployment refers to the process of enabling access to functionality provided by the distributed system (e.g. cloud infrastructure, cloud platform, applications, and/or services). Orchestration refers to the coordination of tasks associated with a distributed system/distributed applications including instantiation, task sequencing, task scheduling, task distribution, scaling, etc. Orchestration may involve obtaining and allocating various resources associated with the distributed system including infrastructure, software, services. Orchestration may also include cloud provisioning, which refers to the process or obtaining and allocating resources and services (e.g. to a user). Configuration refers to the setting up of the various components of a distributed system (e.g. in accordance with a specification). Monitoring, which may be an ongoing process, refers to the process of determining a system state (e.g. number of VMs, workloads, resource use, Quality of Service (QoS), performance, errors, etc.). Management refers to actions that may be taken to administer the distributed system (including applications/services on the system) such as updates, rollbacks, changes (e.g. replacing a first application—such as a load balancer—with a second application), etc. Management may be performed to ensure that the system state complies with policies for the distributed system (e.g. adding appropriate resources when QoS parameters are not met). Management actions may also be taken, for example, in response to input provided by monitoring (e.g. dynamic scaling in response to projected resource demands), and/or some other event, which may be external to the system (e.g. updates and/or rollbacks of applications based on a security issue).

As outlined above, in some embodiments, specification of the composable distributed system may be based on a declarative scheme or declarative model. In some embodiments, based on the specification, components of the distributed system may be automatically configured, orchestrated, deployed, and managed in a consistent and repeatable manner (across systems/cloud providers and across deployments). Further, inconsistencies, dependencies, and incompatibilities may be addressed at the time of specification. In addition, variations from the specified composition (e.g. as outlined in the composable system specification) and/or desired state (e.g. as outlined in the declarative model), may be determined during runtime/execution, and system composition and/or system state may be modified during runtime to match the specified composition and/or desired state. In addition, in some embodiments, changes to the system composition and/or declarative model, which may alter the specified composition and/or desired state, may be automatically and transparently applied to the system. Thus, updates, rollbacks, maintenance, and other changes may be easily and transparently applied to the distributed system. Thus, disclosed embodiments facilitate the specification managing end-to-end composable systems and platforms using declarative models. The declarative model not only provides flexibility in building (composing) the system but also the operation to keep the state consistent with the declared target state.

For example, (a) changes to system composition specification (e.g. selection of a different application for a layer, application updates such as new versions, and/or changes such as additions/deletions of one or more layers) may be monitored; (b) inconsistencies with the specified composition may be identified; and (c) actions may initiated to ensure that the deployed system reflects the modified composition specification. For example, a first load balancer application may be replaced with a second (different) load balancing application if the modified system composition specification indicates that the second load balancing application is to be used. Conversely, when the composition specification has not changed, then runtime failures or errors, which may result in inconsistencies between the running system and the system composition specification, may be flagged, and remedial action may be initiated to bring the running system into compliance with the system composition specification. For example, a load balancing application, which failed or was inadvertently shut down, may be restarted.

As another example, (a) changes to a target (or desired) system state specification (e.g. adding or decreasing a number of VMs in a cluster) may be monitored; (b) inconsistencies between a current state of the system and the target state specification may be identified; and (c) actions may initiated to remediate the inconsistencies (e.g. the number of VM may be adjusted—e.g. new VMs added or existing VMs may be torn down in accordance with the changed target state specification). Conversely, when the target state specification has not changed, then runtime failures or configuration errors, which may result in a current state of the system being inconsistent with the target state specification, may be flagged, and remedial action may be initiated to bring the state of the system into compliance with the target system state specification. For example, a VM that may have crashed or been inadvertently deleted may be restarted/instantiated.

Accordingly, in some embodiments, a declarative implementation of the composable distributed system may ensure that a system converges: (a) in composition with a system composition specification, and/or (b) in state to a target system state specification.

Figure 1B:
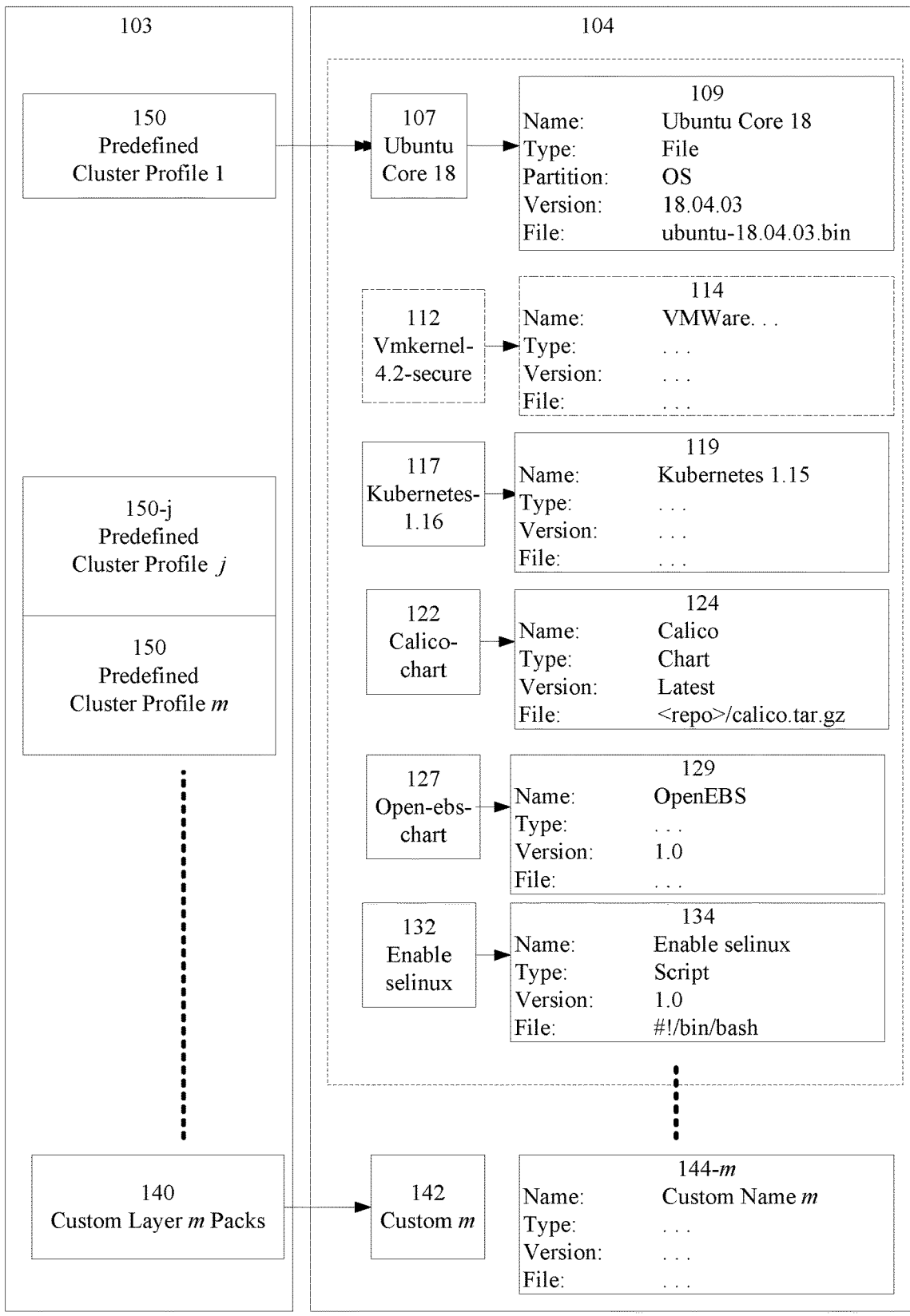

FIGS. 1A and 1B show example approaches for illustrating a portion of a specification of a composable distributed system (also referred to as a "system composition specification" herein). The term "system composition specification" as used herein refers to: (i) a specification and configuration of the components (also referred to as a "cluster profile") that form part of the composable distributed system; and (iii) a cluster specification, which specifies, for each cluster that forms part of the composable distributed system, a corresponding cluster configuration. The system composition specification, which comprises the cluster profile and cluster specification, may be used to compose the distributed system as described in relation to some embodiments herein. In some embodiments, the cluster profile may specify a sequence for installation and configuration for each component in the cluster profile. Components not specified may be installed and/or configured in a default or pre-specified manner. The components and configuration specified in cluster profile 104 may include (or be viewed as including) a software stack with configuration information for individual software stack components and/or for the software stack as a whole.

As shown in FIG. 1A, a system composition specification may include cluster profile 104, which may be used to facilitate description of a composable distributed system. In some embodiments, the system composition specification may be declarative. For example, as shown in FIG. 1A, cluster profile 104 may be constituted by selecting, associating, and configuring cluster profile components. Each cluster profile component may form a layer or part of a layer and the layers may be invoked in a specified sequence to realize the composable distributed system. The layers themselves may be composable thus providing additional customization flexibility. Cluster profile 104 may be used to define the expected or desired composition of the composable distributed system. In some embodiments, cluster profile 104 may be associated with, a cluster specification. The system composition specification S may be expressed as $S=\{(C_i, B_i)|1 \leq i \leq N\}$, where $C_i$ is the cluster specification describing the configuration of the $i^{th}$ cluster (e.g. number of VMs in cluster i, number of master nodes in cluster i, number of worker nodes in cluster i, etc.), and $B_i$ is the cluster profile associated with the $i^{th}$ cluster, and N is the number of clusters specified in the composable distributed system specification S. The cluster profile $B_i$ for a cluster may include a cluster-wide software stack applicable across the cluster, and/or a software stack for each node in the cluster and/or may include software stacks (e.g. associated with cluster sub-profiles) for portions (e.g. node pools or sub-clusters) of the cluster.

A host system or Deployment and Provisioning Entity ("DPE") (e.g. a computer, VM, cloud based deployment/provisioning cluster, or cloud-based service) may obtain and read the cluster profile and cluster specification, and take actions to configure and deploy the composed distributed system (in accordance with system composition specification S), and then manage the running distributed system to maintain consistency with a target state. In some embodiments, the DPE may use cluster profile B, the cluster specification C with associated parameters to build a cluster image for each cluster, which may be used to instantiate and deploy the cluster(s).

As shown in FIG. 1A, cluster profile 104 may comprise a plurality of composable "layers," which may provide organizational and/or implementation details for various parts of the composable system. In some embodiments, a set of "default" layers that are likely to present in many composable systems may be provided. In some embodiments, a user may further add or delete layers, when building cluster profile 104. For example, a user may add a custom layer and/or delete one of the default layers. As shown in FIG. 1A, cluster profile 104 includes OS layer 106, (which may optionally include a kernel layer 111—e.g. when an OS may be configured with specific kernels), orchestrator layer 116, networking layer 121, storage layer 126, security layer 131, and optionally, one or more custom layers 136-*m*, 1≤m≤R, where R is the number of custom layers. Custom layers 136-*m* may be interspersed with other layers. For example, the user may invoke one or more custom layers 136 (e.g. scripts) after execution of one of the layers above (e.g. OS layer 106) and prior to the execution of another (e.g. Orchestrator layer 116). In some embodiments, cluster profile 104 may be entirely comprised of custom layers (which may include an OS layer, orchestrator layer, etc.) configured by a user. Cluster profile 104 may comprise some combination of default and/or custom layers in any order. Cluster profile 104 may also include various cluster profile parameters, which may be associated with layer implementations and configuration (not shown in FIG. 1A).

The components associated with each layer of cluster profile 104 may be selected and configured by a user (e.g. through a Graphical User Interface (GUI)) using cluster profile layer selection menu 102, and the components selected and/or configured may be stored in file such as a JavaScript Object Notation (JSON) file, a Yet Another Meta Language (YAML) file, an XML file, and/or any other appropriate domain specific language file. As shown in FIG. 1A, each layer may be customizable thus providing additional flexibility. For example, cluster profile layer selection menu 102 may provide a plurality of layer packs where each layer pack is associated with a corresponding layer (e.g. default or custom). A layer pack may comprise various cluster profile components that may be associated (either by a provider or a user) with the corresponding layer (e.g. for selection). A GUI may facilitate selection and/or configuration of components associated with a corresponding layer pack. For each layer, cluster profile layer selection menu 102 may facilitate selection of the corresponding available layer components or implementation choices or "Packs". Packs represent available implementation choices for a corresponding layer. In some embodiments, (a) packs may be built and managed by providers and/or system operators (which are referred to herein as "default packs"), and/or (b) users may define, build and manage packs (which are referred to herein as "custom packs"). User selection of pack components/implementations may be facilitated by cluster profile layer selection menu 102, which may be provided using a GUI. In some embodiments, a user may build the cluster profile by selecting implementations associated with a layers and packs. In some embodiments, based on the selection, the system may automatically include configuration parameters (such as version numbers, image location etc.), and also facilitate inclusion of any additional user defined parameters. In addition, the system may also support orchestration, deployment, and management of a composed system based on the cluster profile (e. g cluster profile 104).

As an example, OS layer pack 105 in cluster profile layer selection menu 102 may include various types of operating systems such as: CentOS 7, CentOS 6, Ubuntu 16, Ubuntu Core 18, Fedora 30, RedHat, etc. In some embodiments, OS layer pack 105 may include inline kernels and cluster profile 104 may not include separate kernel sub-layer 111.

In embodiments, where kernel sub-layer 111 is included, kernel sub-layer pack 110 (which may form part of OS layer pack 105) may include mainline kernels (e.g. which introduce new features and are released per a kernel provider's schedule), long term support kernels (such as the LTS Linux 4.14 kernel and modules), and kernels such as the Linux-ck kernel (which includes patches to improve system responsiveness), real-time kernels (which allows preemption of significant portions of the kernel to be preempted), microkernels such as vmkernel-4.2-secure 112 (as shown in FIG. 1A), vm-kernel-4.2, etc.

Orchestrator layer pack 115 in cluster profile layer selection menu 102 may include orchestrators such as kubernetes-1.15, customized-kubernetes-1.15, docker-swarm-3.1, mesos-1.9.0, apache-airflow-1.10.6 117 (not shown in FIG. 1A) etc.

Networking layer 120 pack in cluster profile layer selection menu 102 may include network fabric implementations such as Calico, kubernetes Container Network Interface (CNI) plugins (e.g. Flannel, WeaveNet, Contiv), etc. Networking layer pack 120 may also include helm chart based network fabric implementations such as a "Calico-chart" (e.g. Calico-chart 4 122, as shown in FIG. 1A). Helm is an application package manager that runs over Kubernetes. A "helm chart" is a specification of the application structure. Calico facilitates networking and the setting up network policies in Kubernetes clusters. Container networking facilitates interaction between containers, the host, and outside networks (e.g. the Internet). The CNI framework outlines a plugin interface for dynamically configuring network resources when containers are provisioned or terminated. The plugin interface (outlined by the CNI specification) facilitates container runtime coordination with plugins to configure networking. CNI plugins may provision and manage an IP address to the interface and may provide functionality for IP management, IP assignment to containers, multi-host connectivity, etc. The term "container runtime" refers to software that executes containers and manages container images on a node. In some embodiments, cluster profile 104 may include a custom runtime layer (not shown) and an associated runtime layer pack (not shown), which may include runtime implementations such as Docker, CRI-O, rkt, ContainerD, RunC, etc.

Storage layer pack 125 in cluster profile selection menu 102 may include storage implementations such as Open-EBS, Portworx, Rook, etc. Storage layer pack 125 may also include helm chart based storage implementations such as a "Open-ebs-chart." Security layer pack 130 may include helm charts (e.g. nist-190-security-hardening). In some embodiments, cluster profile layer selection menu 102 may provide (or provide an option to specify) one or more user-defined custom layer m packs 140, 1≤m≤R. For example, the user may specify a custom "load balancer layer" (in cluster profile layer selection menu 102) and an associated load balancer layer pack (e.g. as custom layer 1 pack 140-1), which may include load balancers such as F5 Big IP, AviNetworks, Kube-metal, etc.

Any layer pack may include scripts including user-defined scripts that may be run on the system host during provisioning or at some other specified time (during scaling, termination, etc.).

In general, as shown in FIG. 1A, a cluster profile (e.g. cluster profile 104) may comprise several layers (default and/or custom) and appropriate layer implementations (e.g. "Ubuntu Core 18" 107, "Kubernetes 1.15" 117) may be selected for each corresponding layer (e.g. OS layer 106, Orchestrator layer 109, respectively) from the corresponding pack (e.g. OS layer pack 105, Orchestrator layer pack 115, respectively). In some embodiments, cluster profile 104 may also include one or more custom layers 136-*m*, each associated with a corresponding custom layer implementation 144-*m* selected from corresponding custom layer pack 140-*m* in cluster profile layer selection menu 102.

In FIG. 1A, the OS layer 106 in cluster profile layer selection menu 102 is shown as including the "Ubuntu Core 18" 107 along with Ubuntu Core 18 configuration 109, which may specify one or more of: the name, pack type, version, and/or additional pack specific parameters. In some embodiments, the version (e.g. specified in the corresponding configuration) may be a concrete or definite version (e.g., "18.04.03"). In some embodiments, the version (e.g. specified in the corresponding configuration) may be a dynamic version (e.g., specified as "18.04.x" or using another indication), which may resolved to a definite version (e.g. 18.04.03) based on a dynamic to definite version mapping at a cluster provisioning or upgrading time for the corresponding cluster specification associated with cluster profile 104.

Further, kernel layer 111 in cluster profile layer selection menu 102 also includes Vmkernel-4.2-secure 112 along with Vmkernel-4.2-secure configuration 114, which may specify one or more of: the name, pack type, version, along with additional pack specific parameters.

Similarly, orchestrator layer 116 in cluster profile layer selection menu 102 includes Kubernetes-1.15 117 as the orchestrator and is associated with Kubernetes-1.15 configuration 119.

In addition, networking layer 121 in cluster profile layer selection menu 102 includes Calico-chart-4 122 as the network fabric implementation. Calico-chart-4 is associated with Calico-chart-4 configuration 124, which indicates that Calico-chart-4 is a helm chart and may include a repository path/file name (shown as <repo>/calico-v4.tar.gz) to request/obtain the network fabric implementation. Similarly, storage layer 126 in cluster profile layer selection menu 102 includes Open-ebs-chart1.2 127 as the storage implementation and is associated with Open-ebs-chart1.2 configuration 129. Security layer 132 is implemented in cluster profile 104 using the "enable selinux" script 132, which is associated with "enable selinux" configuration 134 indicating that "enable selinux" is a script and specifying path/filename (shown as $!/bin/bash). Cluster profile layer selection menu 102 may also include addition custom layers 136-$i$, each associated with corresponding custom implementation 142-$k$ and custom implementation configuration 144-$k$.

In some embodiments, when a corresponding implementation (e.g. Ubuntu Core 18) is selected for a layer (e.g. OS layer 106), then: (a) all pre-requisites for running the selected implementation may also be included and/or specified when the implementation is selected; and/or (b) any incompatible implementations for another layer (e.g. orchestrator layer 116) may be excluded from selection menu 102. Thus, cluster profile layer selection menu 102 may prevent incompatible inter-layer implementations from being used together thereby preventing potential failures, errors, and decreasing the need for later rollbacks and/or reconfiguration. Intra-layer incompatibilities (within a layer), may also be avoided by: (a) ensuring selection of implementations that are to be used together (e.g. dependent); and/or (b) preventing selection of incompatible implementations that are available with a layer. For example, mini cluster profiles may be created within a layer (e.g. after testing) to ensure that dependencies and/or incompatibilities are addressed. In addition, because individual layers are customizable and the granularity of layers in the cluster profile is also customizable, greater flexibility is system composition is facilitated at every layer and for the system as a whole. Because both the number of layers as well as the granularity of each layer can be user-defined (e.g. via customizations), end-to-end distributed system composability is facilitated. For example, a user may fine tune customizations (higher granularity) for layers/portions of a cluster profile, which are of interest, but use lower levels of granularity for other layers/portions of the cluster profile.

The use of cluster profiles, which may be tested, published, and re-used, facilitates consistency, repeatability, and facilitates system wide maintenance (e.g. rollbacks/updates). Further, by using a declarative model to realize the distributed system (as composed)—compliance with the system composition specification (e.g. as outlined in the cluster profile and cluster specification) can be ensured. Thus, disclosed embodiments facilitate both flexibility and control when defining distributed system composition and structure. In addition, disclosed embodiments facilitate customization (e.g. specification of layers and packs for each layer), selection (e.g. selecting available components in a pack) and configuration (e.g. parameters associated with layers/components) of: the bootloader, operating system, kernel, system applications, tools and services, as well as orchestrators like Kubernetes, along with applications and services running in Kubernetes. Disclosed embodiments also ensure compliance with a target system state specification based on a declarative model. As an example, a declarative model implementation may: (a) periodically monitor distributed system composition and/or system state during distributed system deployment, orchestration, run time, maintenance, and/or tear down (e.g. over the system lifecycle); (b) determine that a current system composition and/or current system state is not in compliance with a system composition specification and/or target system state specification, respectively; and (c) effectuate remedial action to bring system composition into compliance with the system composition specification and/or the target system state specification, respectively. In some embodiments, the remedial action to bring system composition into compliance with the system composition specification and/or the target system state specification, respectively, may be effectuated automatically (without user intervention when variance with the specified composition and/or target system state is detected), dynamically (e.g. during runtime operation of the distributed system). Remedial actions may be effectuated dynamically both in response to composition specification changes and/or target system state specification changes as well as operational or runtime deviations (e.g. from errors/failures during system operation). Moreover, some disclosed embodiments also support increased distributed system availability and optimize system performance because remediation in response to variance (e.g. from the specified composition and/or target system state) is focused on addressing the current variance (e.g. delta from the specified composition and/or target system state). as opposed to rebuilding and/or redeploying the entire system. For example, a single node (that may have failed) may be restarted and/or a newly specified load balancer may be used in place on existing load balancer.

FIG. 1B shows another example approach illustrating the specification of composable distributed applications. As shown in FIG. 1B, cluster profile may be pre-configured and presented to the user as pre-defined cluster profile 150 in a cluster profile selection menu 103. In some embodiments, a provider or user may save or publish the cluster profiles (e.g. after testing), which may then be selected and used by other users thereby simplifying orchestration and deployment. FIG. 1B shows pre-defined profiles 150-$j$, $1 \leq j \leq Q$. In some embodiments, user may add customizations to pre-defined profile 150 by adding custom layers i and/or modifying pack selection for a layer and/or deleting layers. The user customized layer may be saved (e.g. after testing) and/or published (e.g. shared with other users) as a new pre-defined profile.

FIGS. 1C and 1D shows an example declarative cluster profile definition 150 in accordance with disclosed embodiments. As shown in FIGS. 1C and 1D, cluster profile definition 150 corresponds to cluster profile 104 (FIG. 1A) and shows example selected OS layer implementation 106, kernel layer implementation 111, orchestrator layer implementation 116, networking layer implementation 121, storage layer implementation 126, and security layer implementation 131. Cluster profile definition 150 may form part of a system composition specification S. As outlined above, the components associated with each layer of cluster profile 104 may be selected and/or configured by a user using cluster profile layer selection menu 102 or cluster profile selection menu 103, and the selected and/or configured components/ implementations may be stored in file such as a JSON file, a YAML file, an XML file, and/or appropriate domain specific language files. In some embodiments, the cluster profile definition 150 may be auto-generated based on user selections and/or applied configurations.

As shown in FIG. 1C, OS layer implementation 106 indicates that the file "ubuntu-18.04.03.bin" associated with "Ubuntu Core 18" (e.g. selected from OS Layer Packs 105 in FIG. 1A) is to be used for OS layer implementation 106. The "ubuntu-18.04.03.bin" file may be loaded on to the system using an adapter, which is specified as "flash-bin-to-system-partition." In some embodiments, an "adapter component" or "adapter" applies the selected implementation (e.g. "ubuntu-18.04.03.bin") to the system. In some embodiments, adapters may use cloud-specific and/or cloud-native commands when the distributed system is deployed (fully or partially) on clouds (which may include public and/or private clouds). Adapters may be defined for each layer and/or layer component in the system. The adapter may apply the selected implementation for the corresponding layer to the system. In some embodiments, the adapter may take the form of program code, a script, and/or command(s). For example, as shown in FIG. 1C, the "flash-bin-to-system-partition" adapter associated with OS layer implementation 106 may flash the designated operating system binary (e.g. "ubuntu-18.04.03.bin" corresponding to:"Ubuntu Core 18" selected from OS Layer Pack 105) to the system partition (which may identified or provided as a parameter to the adapter). In some embodiments, the adapter may run on a node (e.g. a computer, VM, or cloud based service, which may configure, deploy, and manage the user-composed distributed system). In some embodiments, the adapter may run as a container (e.g. a Docker container) on the node.

In FIG. 1C, kernel layer implementation 111 specifies that "Vmkernel-4.2-secure.bin" is to be used for the kernel, and orchestrator layer implementation 116 specifies that "Kubernetes-1.15.2.bin" is to be used for the orchestrator. In some embodiments, cluster profile definition 150 may be used to build, deploy, and manage the distributed system, as composed, as described further herein. The layers and adapters definitions and implementations may be provided by the system, or in certain circumstances, could be supplied by other vendors or users.

FIG. 1D shows networking layer implementation 121, which indicates that the file "repo>/calico.tar.gz" associated with "Calico-chart-4" 122 (e.g. selected from Networking Layer Packs 120 in FIG. 1A) is to be used for networking. The "repo>/calico.tar.gz" may be loaded on to the system using an adapter, which is specified as a helm chart "helm . . . ".

Storage layer implementation 126 indicates that the file "repo>/OpenEBS" associated with "OpenEBS-chart" 127 (e.g. selected from Storage Layer Packs 125 in FIG. 1A) is to be used for storage. The "repo>/OpenEBS" may be loaded on to the system using an adapter, which is specified as a helm chart "helm . . . ".

Security layer implementation 131 indicates that the "enable selinux" script associated with "Enable sellinux" 132 (e.g. selected from Security Layer Packs 130 in FIG. 1A) is to be used for security. Security layer implementation 131 indicates that the "enable selinux" script may be run using "$!/bin/bash" shell.

In some embodiments, cluster profile definition 150 may include layer implementations with a custom adapter. For example, security layer implementation 131 (FIG. 1D) may use a custom adapter "Security 1" implemented as a Docker container. The "agent" deploying cluster profile 104 will download and execute the appropriate adapter at the appropriate time and in appropriate sequence. Other example adapters may include "Write File(s) to Disk", "Run Kubernetes Helm Chart", "Run Script,", etc. As other examples, adapters could be implemented using specific commands, puppet/chef commands, executables, and/or language specific scripts (e.g.: python, ruby, nodejs), etc. As outlined above, adapters may also use cloud-specific and/or cloud-native commands to initiate the selected layer implementation. Thus, in some embodiments, implementations for layers (including Network, Storage, Security, Service Mesh, Metrics, Logging, Transaction tracing, Monitoring, Container Runtime, authentication, etc.) could be implemented using corresponding adapters.

Figure 1E:
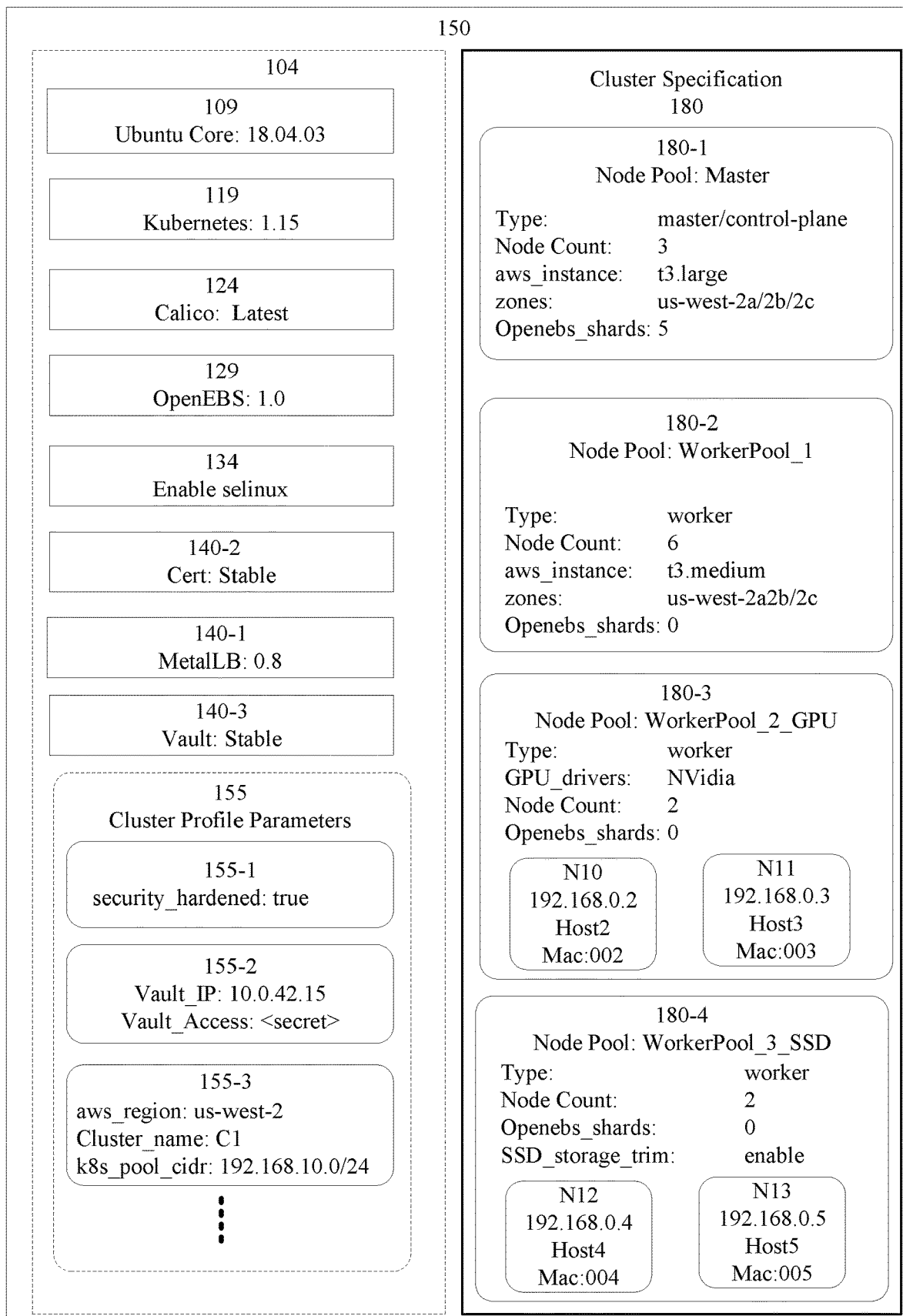
FIGS. 1E and 1F show a portions of an example system composition specification.

FIG. 1E shows a portion an example system composition specification $S=\{(C_i, B_i)|1 \le i \le N\}$ 150. As shown in FIG. 1E, cluster profile 104 may comprise layer implementations (e.g. "Ubuntu Core: 18.04.03" 109, "Kubernetes: 1.15" 119, "Calico: Latest" 124, "OpenEBS: 1.0" 129, custom layers 140-1 through 140-3) and cluster profile parameters 155 (e.g. security related parameters 155-1, vault parameters 155-2, and cloud provider parameters 155-3). Further, as shown in FIG. 1E, example system composition specification 150 may include cluster specification 180, which may include parameters for node pools in the cluster.

Accordingly, as shown in FIG. 1E, system composition specification 150 includes example cluster profile 104 with: (a) Ubuntu Core as the selected OS layer implementation 109 with corresponding major version 18, minor version 4, and release 03 (shown as Version 18.04.03 in FIGS. 1A, 1B, 1C and 1E); (b) Kubernetes as the selected Orchestrator layer implementation 119 with major version 1 and minor version 16 (shown as Version 1.16 in FIGS. 1A, 1B, 1C, and 1E); (c) Calico as the selected Networking layer implementation 124 with Version indicated as "Latest"; and (d) OpenEBS as the selected Storage layer implementation 129 with major version 1 and minor version 0 (shown as Version 1.0 in FIGS. 1A, 1B, 1D, and 1E).

FIG. 1E also shows custom layers: (e) 140-1 (corresponding a to a Load Balancing layer in FIG. 1E) with selected implementation MetalLB as the load balancer with major version 0 and minor version 8 (shown as "MetalLB 0.8" in FIG. 1E); (f) 140-2 corresponding to certificate manager "Cert" with version indicated as "Stable"; (g) 140-3 corresponding to an authentication manager "Vault" with version indicated as "Stable".

FIG. 1E also shows cluster profile parameters 155, which may include (global) parameters 155 associated with the cluster profile 104 as a whole and/or to one or more layer implementations in cluster profile 104). For example, security related parameters "security_hardened: true" 155-1, cloud provider parameters 155-3 such as "aws_region: us-west-2", "cluster_name: C1", and IP address values for "k8s_pod_cidr" pertain to the cluster as a whole. Cluster profile parameters 155-2 are also global parameters associated with authentication manager Vault 140-3 indicating the Vault IP address (10.0.42.15) and that access is "secret".

In some embodiments, versions associated with cluster profile 104 may include a major version label (e.g. "18" for Ubuntu 18.04.03), and/or a minor version label (e.g. "04" for Ubuntu 18.04.03), and/or a release (e.g. "03" for Ubuntu 18.04.3). In instances where, dynamic versioning is used, a major version and minor version may be specified without specification of a release. Accordingly, during composition based on system composition specification 150, the latest release of the corresponding layers implementation for that major and minor version may be used when composing the composable distributed system. For example, if the latest release of "Kubernetes 1.15" is "07", then specifying "Kubernetes 1.15" (without specification of the release) for Orchestrator layer 119 may automatically result in the system being composed with the latest release (e.g. "07") corresponding to the specified major version (e.g. "1") and the specified minor version (e.g. "16") resulting in "Kubernetes 1.15.07", when the system is composed. Similarly, specifying the major version (e.g. "1" in Kubernetes) without specifying any minor version or release may automatically result in the system being composed with the latest release and latest minor version corresponding to the specified major version (e.g. "1"). For example, if the specified major version is "1" and the corresponding latest minor version and release are "16" and "01", respectively, then specifying "Kubernetes 1" may automatically result in a system with "Kubernetes 1.16.01", when the system is composed. In addition, labels such as "Latest" or "Stable" may automatically result in the latest version of a layer implementation or the last known stable version of a layer implementation, respectively, forming part of the composed system. The term "dynamic versioning" refers to the use of labels without specification of a complete version information for implementations associated with a cluster profile. Dynamic versioning may occur either: (a) explicitly (e.g. descriptive labels such as "Stable," "Latest," "x", etc.), or (b) implicitly (e.g. by using partial or incomplete version information such as "Kubernetes 1.15").

In addition, in some embodiments, when a new major version or new minor version or new release of a layer implementation is available, then, the appropriate new version (e.g. major, minor, release, latest, or stable) for the layer implementation may be automatically updated. For example, an agent may monitor releases (e.g. based on corresponding Uniform Resource Locators (URLs) for a layer implementation and determine (e.g. based on the composition specification 150 and/or cluster profile 104) whether a current layer implementation is to be updated when new implementations are released. If (e.g. based on composition specification 150 and/or cluster profile 104) the agent determines that one or more layer implementations are to be updated (e.g. the corresponding version label is "latest"), then the agent may initiate downloads of the appropriate layer implementations (e.g. to a repository) and update the current system. In some embodiments, the updates may be logged and/or recorded (e.g. as parameters 155 in the configuration specification 150 so that the current installed versions for each layer implementation may be determined). When composition specification 150 and/or cluster profile 104 indicate that a version associated with a layer implementation is "Stable", then updates may be performed when a vendor indicates that a later release (e.g. relative to current layer implementation) is stable. The labels above are merely examples of parameters and/or rules, which may form part of cluster profile 104. The parameters and/or rules (e.g. specified in cluster profile 104) may be used to dynamically determine (or update) components or implementations (e.g. a software stack) associated with nodes and/or node pools associated with a cluster.

As shown in FIG. 1E, example system composition specification 150 may further include and specify a configuration of nodes in the cluster. The configuration of nodes may specify roles for nodes (e.g. master, worker, etc.), and/or an organization of nodes (e.g. into node pools), and capabilities of nodes (e.g. in related to a function or role to be performed by the node, and/or in relation to membership in a node pool). System composition specification 150 may further include node pool specifications (also referred to as "node pool parameters") 180-k, each associated with a corresponding node pool k in the cluster. In some embodiments, system composition specification 150 may define one or more node pool specifications (also referred to as node pool parameters) 180-k as part of cluster specification 180. Each node pool specification 180-k in cluster specification 180 may include parameters for a corresponding node pool k. A node pool defines a grouping of nodes in a cluster $C_i$ that share at least some configuration. Node pools may be dynamic or static. In the embodiment of FIG. 1E, a separate node pool "Master" 180-1 comprising "master nodes" for the cluster is shown. The embodiment of FIG. 1E is merely an example and various other configurations are possible and envisaged. For example, in some embodiments, one or more nodes in any node pool in a cluster may be designated or selected as "master nodes" or "lead nodes" and there may be no distinct "master node pool." In some embodiments, one or more nodes in any node pool in a cluster may be designated or selected as "master nodes" or "lead nodes" in addition to one or more separate "master node pools."

Dynamic node pools may define properties and configurations of nodes that are to be launched on public and private clouds. Node pool parameters for dynamic node pools may include: node count, hardware specification (e.g. instance type), and other cloud-specific placement requests like geographic availability zones. In some embodiments, the underlying orchestration system will provision the designate number of nodes (e.g. specified by the Node Count parameter) as designated by example system composition specification 150. In some embodiments, node pool may include a specification of the node pool to indicate its type, such as "Master", or "Worker". As shown in FIG. 1E, dynamic node pool parameters for node pools: Master 180-1 (of type "master/control-plane") and WorkerPool_1 180-2 (of type "worker") may include node counts (3 and 6, for node pools Master 180-1 and WorkerPool_1 180-2, respectively), Amazon Web Services (AWS) instance type (shown as "t3.large" and "t3.medium" for node pools Master 180-1 and WorkerPool_1 180-2, respectively), AWS zones (shown as us-west-2a/2b/2c for both node pools Master 180-1 and WorkerPool_1 180-2). During orchestration, the orchestrator will provision 3 nodes for node pool Master 180-1 and 6 nodes for node pool WorkerPool_1 180-2.

Static node pools may be used for any environment including public clouds, private clouds, and/or bare-metal environments. In some embodiments, static node pools may reference existing nodes, which, in some instances, may be pre-bootstrapped. During the orchestration phase these nodes may be configured to join a designated node pool (or cluster) as designated by the example system composition specification 150. Static nodes include a specification of one or more of: the Internet Protocol (IP) address, and/or hostname, and/or Medium Access Control (MAC) address. Static node pools may be used in public and private clouds, including (but not limited to) environments where the underlying orchestration system may lack support for deploying/launching dynamic node pools.

For example, as shown in FIG. 1E, node pool WorkerPool_2_GPU 180-3 is a static node pool since it references two nodes (which, in some instances, may be pre-bootstrapped). Further, as shown in FIG. 1E, WorkerPool_2_GPU 180-3 may use nodes pre-provisioned with Graphical Processing Units (GPUs) and the pre-provisioned nodes (shown as N10 and N11) are identified by the corresponding host names (Host2 and Host3, respectively), node IP addresses (192.168.0.2 and 192.168.0.3, respectively), and MAC addresses (002 and 003, respectively). For WorkerPool2_GPU 180-3, additional GPU drivers are specified so that the orchestration system may use (or provide driver detail to appropriate agents), which may install additional drivers, as appropriate.

Similarly, node pool WorkerPool_3_SSD 180-4 is a static node pool where nodes N12 and N13 are optimized for performance-storage systems (e.g. using Solid State Drives (SSDs). Further, as shown in FIG. 1E, WorkerPool_3_SSD 180-4 may use nodes pre-provisioned with Solid State Drives (SSDs) and the pre-provisioned nodes (shown as N12 and N13) are identified by the corresponding host names (Host4 and Host5, respectively), node IP addresses (192.168.0.4 and 192.168.0.5, respectively), and MAC addresses (004 and 005, respectively). For WorkerPool_3_SSD 180-4, an additional SSD parameter "SSD_storage_trim" may be used (or provided to appropriate agents), which may optimize nodes N12 and N13 for SSD performance.

Node pool parameters may also include other parameters or parameter overrides—such as OpenEBS configuration for nodes in the pool. For example, distribution, isolation and/or access policies for OpenEBS shards may be specified. For example, node pools: Master 180-1 indicates an "openebs_shards" parameter override, which indicates that 5 openebs shards are to be used. "Shards" refer to smaller sections of a large database or table. The smaller sections or shards, which form part of the larger database, may be distributed across multiple nodes and access policies for the shards may be specified as part of node pool parameters 180-$p$ (or parameter overrides).

Figure 1F:
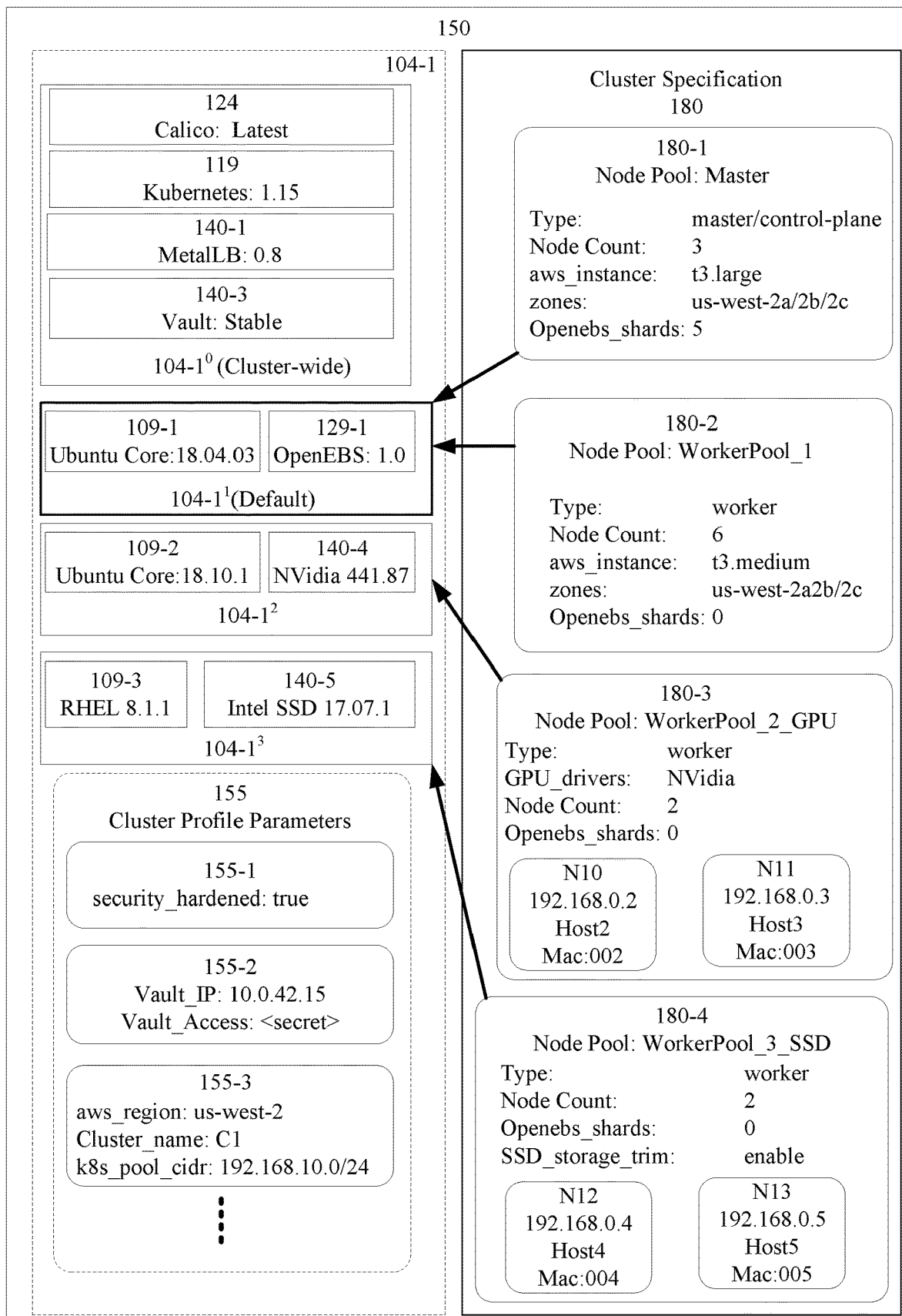

FIG. 1F shows a portion of another example system composition specification S={$(C_i, B_i) | 1 \leq i \leq N$} 150, where cluster profiles $B_i$ (e.g. $B_1$ 104-1, for i=1) may comprise: (a) a cluster-wide cluster profile (e.g. 104-1$^0$) which may applicable across an entire cluster $T_i$ (e.g. a cluster $T_1$ corresponding to a cluster profile $B_1$ 104-1, for i=1); and/or (b) one or more cluster sub-profiles (e.g. 104-1$^2$, 104-1$^3$, 104-1$^4$, etc.), which may be applicable to one or more portions of the cluster (e.g. a portion of cluster $T_1$, to one or more sub-clusters of cluster $T_1$, and/or one or to more node pools (e.g. specified in cluster specification 180) in cluster $T_1$).

For example, as shown in FIG. 1F, cluster profile 104-1$^0$ may specify cluster-wide layer implementations (e.g. orchestrator layer implementation "Kubernetes: 1.15" 119, networking layer implementation "Calico: Latest" 124, as well as custom load balancing layer implementation MetalLB 0.8, and custom authentication manager layer implementation "Vault" with version indicated as "Stable"). Layer implementations specified in cluster sub-profile 104-1$^0$ may apply across the cluster (e.g. to each node pool, sub-cluster, or portion of the cluster $T_1$). Thus, cluster profile 104-1$^0$ may be viewed as specifying aspects that are common to the cluster as a whole (e.g. 104-1$^1$), such as orchestrator, network, security and/or custom layer implementations as outlined above in relation to FIG. 1F. In some embodiments, each cluster profile $C_i$ may include a cluster-wide cluster profile 104-$i^0$ for each cluster $T_i$.

Further, each cluster profile $B_i$ 104-$i$ may include one or more cluster sub-profiles 104-$i^s$, s≥1, which may be applicable to one or more portions of the cluster (e.g. a node pool). Cluster sub-profiles may vary between different portions of the cluster (e.g. between node pools). For example, a first node pool (and/or a first set of node pools) may be associated with a first cluster sub-profile, while a second node pool (and/or a second set of node pools) may be associated with a second cluster sub-profile different from the first cluster sub-profile. Thus, in some embodiments, distinct node pools within a cluster may be associated with distinct cluster sub-profiles so that cluster sub-profiles may be node-pool specific, Cluster sub-profiles may be viewed as describing aspects specific to each node pool (such as operating system, additional scripts, and/or modules) and may vary from node-pool to node-pool.

In some embodiments, one cluster sub-profile 104-$i^D$, for some s may be specified as a default cluster sub-profile. Accordingly, in some embodiments, node pools or sub-clusters that are not explicitly associated with a corresponding cluster-sub-profile may be automatically associated with the default cluster sub-profile 104-$i^D$.

For example, as shown in FIG. 1F, a cluster sub-profile 104-1$^1$, which includes OS layer implementation "Ubuntu Core 18.04.03" 109-1 and storage layer implementation "OpenEBS 1.0" 129-1 may be associated (as indicated by the arrows in FIG. 1F) with node pools described as Master 180-1 and WorkerPool_1 180-2 in cluster specification 180. Further, as shown in FIG. 1F, cluster sub-profile 104-1$^1$ (s=1) may be designated as a "Default" sub-profile. Accordingly, node pools that are not explicitly associated with a cluster sub-profile may be automatically associated with cluster sub-profile 104-1$^D$=104-1$^1$. Thus, node pools described as Master 180-1 and WorkerPool_1 180-2 in cluster specification 180 may use implementations based on: (i) cluster-wide cluster sub-profile 104-1$^0$, and (ii) cluster sub-profile 104-1$^1$.

Further, as shown in FIG. 1F, cluster sub-profile 104-1$^2$ is associated with node pool described as WorkerPool_2_GPU 180-3. Further, as outlined above, WorkerPool_2_GPU 180-3 may also be associated with cluster wide sub-profile 104-1$^0$. As shown in FIG. 1F, cluster sub-profile 104-1$^2$ uses a different version of the operating system layer implementation "Ubuntu 18.10.1" 109-2 and also specifies (custom) GPU driver implementation "NVidia 44.187" 140-4.

FIG. 1F also shows cluster sub-profile 104-1$^3$ is associated with node pool described as WorkerPool_3_SSD 180-4. Further, as outlined above, WorkerPool_3_SSD 180-4 may also be associated with cluster wide sub-profile 104-1$^0$. As shown in FIG. 1F, cluster sub-profile 104-1$^3$ uses a different operating system layer implementation shown as Red Hat Enterprise Linux 8.1.1 or ""RHEL 8.1.1" 109-3 with (custom) SSD driver implementation "Intel SSD 17.07.1" 140-5.

In some embodiments, nodes within a node pool may share similar configurations. For example, a composable distributed system (e.g. as specified by system composition specification S 150, which may be expressed as $S=\{(C_i,B_i) | 1 \leq i \leq N\}$, may comprise a plurality of clusters $C_i$, where each node that is part of a node pool in cluster $C_i$ may share a similar configuration (e.g. include SSDs, as in FIG. 1F) and may be associated with one or more cluster sub-profiles (e.g. (i) a cluster wide sub-profile 104-$i^0$, and (ii) a cluster specific sub-profile 104-$i^s$, $s \geq 1$, which, in some instances, may be a default cluster sub-profile. In some embodiments described below, reference is made to cluster profiles. It is to be understood, that cluster profiles may comprise cluster sub-profiles (e.g. corresponding to node pools within the cluster).

Figure 2A:
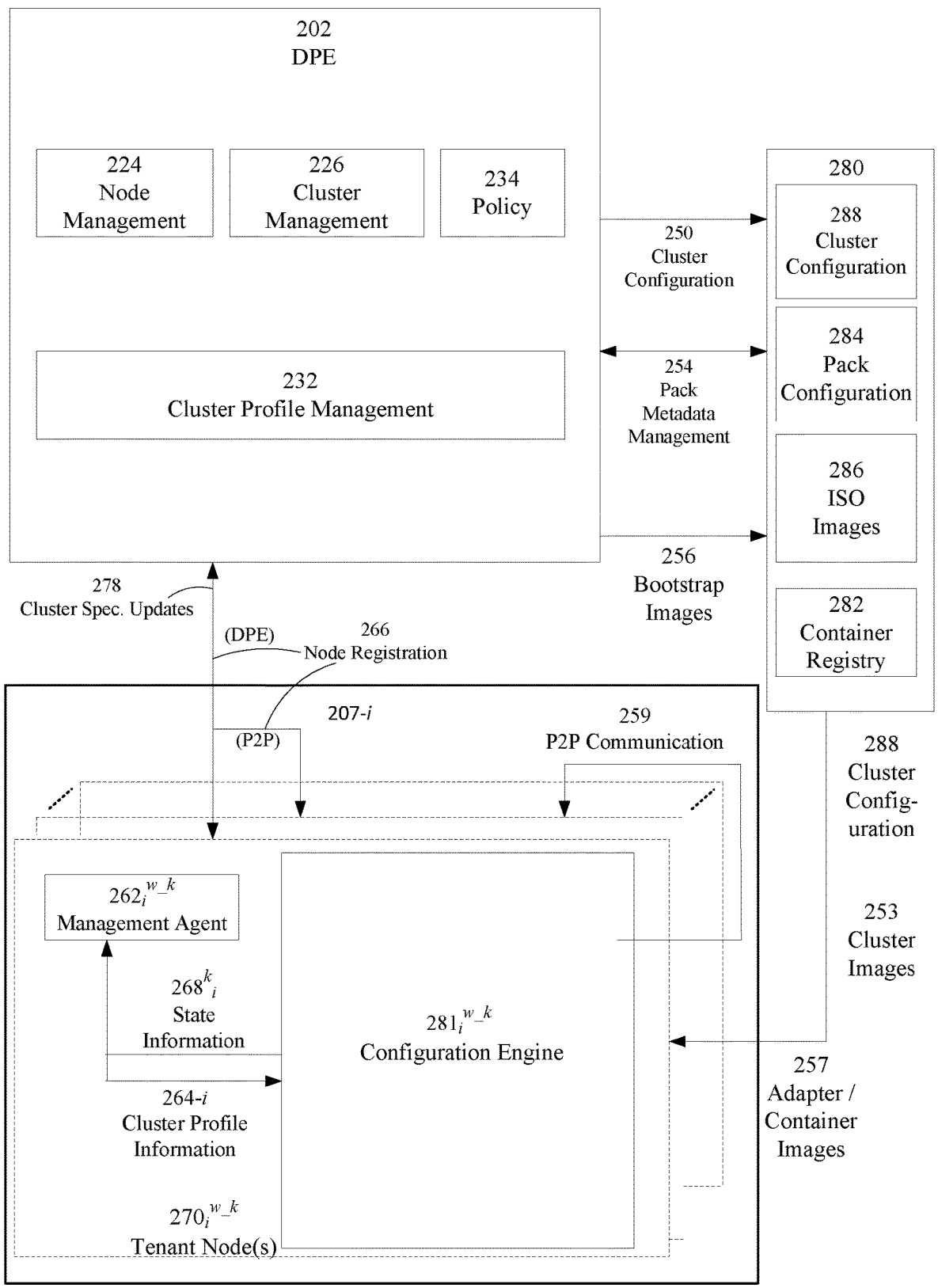
FIG. 2A shows an example architecture to build and deploy a composable distributed system.

FIG. 2A shows an example architecture 200 to build and deploy a composable distributed system. Architecture 200 may support the specification, orchestration, deployment, monitoring, and updating of a composable distributed system in accordance with some disclosed embodiments. In some embodiments, one or more of the functional units of the composable distributed system may be cloud-based. In some embodiments, the composable distributed system may be implemented using some combination of: cloud based systems and/or services, and/or physical hardware (e.g. a computer with a processor, memory, network interface, and/or with computer-readable media). For example, DPE 202 may take the form of a computer with a processor, memory, network interface, and/or with computer-readable media, and/or a VM.

In some embodiments, architecture 200 may comprise DPE 202, one or more clusters $T_i$ 207-$i$ (also referred to as "tenant clusters"), and repository 280. Composable distributed system may be specified using system composition specification $S=\{(C_i, B_i) | 1 \leq i \leq N\}$ 150, where $T_i$ 207-$i$ corresponds to the cluster specified by cluster specification $C_i$ 180 and each node $270_i^{w\_k}$ in cluster $T_i$ 207-$i$ may be configured in a manner consistent with cluster profile $B_i$ 104-$i$. Further, each node $270_i^{w\_k}$ in cluster $T_i$ 207-$i$ may form part of a node pool k, wherein each node pool k in cluster $T_i$ 207-$i$ is configured in accordance with cluster specification $C_i$ 180. In some embodiments, composable distributed system may thus comprise a plurality of clusters $T_i$ 207-$i$, where each node $270_i^{w\_k}$ in node pool k may share a similar configuration, where $1 \leq k \leq P$ and P is the number of node pools in cluster $T_i$ 207-$i$; and $1 \leq w \leq W\_k$, where $W\_k$ is the number of nodes in node pool k in cluster $T_i$ 207-$i$.

For example, DPE 202, which may serve as a configuration, management, orchestration, and deployment interface, may be provided as a cloud-based service (e.g. SaaS), while the user-composed distributed system may run over physical hardware. As another example, DPE 202 may be provided as a cloud-based service (e.g. SaaS), and the user-composed distributed system may run on cloud-infrastructure (e.g. a private cloud, public cloud, and/or a hybrid public-private cloud). As a further example, DPE 202 may be a server running on a physical computer, and the user-composed distributed system may be deployed (initially) over bare metal (BM) nodes. The term "bare metal" is used to refer to a computer system without an installed base OS and without installed applications. In some embodiments, the bare metal system may include firmware or flash/Non-Volatile Random Access Memory (NVRAM) memory program code (also referred to herein as "pre-bootstrap code"), which may support some operations such as network connectivity and associated protocols.

In some embodiments, DPE 202 may provide an interface to compose, configure, orchestrate, and deploy distributed systems/applications. DPE 202 may also provide functionality to enable logging, monitoring, and compliance with the desired state (e.g. as indicated in a declarative model/composable system specification 150 associated with the distributed system). DPE 202 may include a user interface (UI), which may facilitate user interaction in relation to one or more of the functions outlined above. In some embodiments, DPE 202 may be accessed remotely (e.g. over a network such as the Internet) through the UI and used to invoke, provide input to and/or to receive/relay information from one or more of: Node management block 224, Cluster management block 226, Cluster profile management 232, Policy management block 234, and/or configure monitoring block 248.

Node management 224 may facilitate registration, configuration, and/or dynamic management of user nodes (including VMs), while cluster management block 228 may facilitate configuration and/or dynamic management of clusters $T_i$ 207-$i$. Node management block 224 may also include functionality to facilitate node registration. For example, when DPE 202 is provided as an SaaS, and the initial deployment occurs over BM nodes, each tenant node $270_i^{w\_k}$ may register with node management 224 on DPE 202 to exchange node registration information (DPE) 266, which may include node configuration and/or other information.

In some embodiments, nodes may obtain and/or exchange node registration information (P2P) 266 by initiating discovery of other nodes in the network using automatic peering or peer-to-peer (P2P) discovery and obtain configuration information from peers (e.g. from a master node or lead node in a node pool k) using P2P communication 259. In some embodiments, a node $270_i^{w\_k}$ that detects no other nodes (e.g. a first node in a to-be-formed in node pool k in cluster $T_i$ 207-$i$) may configure itself as the lead node $270_i^{l\_k}$ (designated with the superscript "l") and initiate formation of node pool k in cluster $T_i$ 207-$i$ based on a corresponding cluster specification $C_i$ 180. In some embodiments, specification $C_i$ 180 may be obtained from DPE 202 as cluster specification update information 278 and/or by management agent $262_i^k$ from a peer node (e.g. when cluster $T_i$ 207-$i$ has already been formed).

Cluster profile management block 232 may facilitate the specification and creation of cluster profile 104 for composable distributed systems and applications. For example, cluster profiles (e.g. cluster profile 104 in FIG. 1A) may be used to facilitate composition of one or more distributed systems and/or applications. As an example, a UI may provide cluster profile layer selection menu 102 (FIG. 1A), which may be used to create, delete, and/or modify cluster profiles. Cluster profile related information may be stored as cluster configuration information 288 in repository 280. In some embodiments, cluster configuration related information 288 (such as Ubuntu Core 18 configuration 109) may be used during deployment and/or to create a cluster profile definition (e.g. cluster profile definition 106 in FIG. 1C), which may be stored, updated, and/or obtained from repository 280. Cluster configuration related information 288 in repository 280 may further include cluster profile parameters 155. In some embodiments, cluster configuration related information 288 may include version numbers and/or version metadata (e.g. "latest", "stable" etc.), credentials, and/or other parameters for configuration of a selected layer implementation. In some embodiments, adapters for various layers/implementations may be specified and stored as part of cluster configuration related information 288. Adapters may be managed using cluster profile management block 232. Adapters may facilitate installation and/or configuration of layer implementations on a composed distributed system.

Pack configuration information 284 in repository 280 may further include information pertaining to each pack, and/or pack implementation such as: an associated layer (which may be a default or custom layer), a version number, dependency information (i.e. prerequisites such as services that the layer/pack/implementation may depend on), incompatibility information (e.g. in relation to packs/implementations associated with some other layer), file type, environment information, storage location information (e.g. a URL), etc.

In some embodiments, pack metadata management information 254, which may be associated with pack configuration information 284 in repository 280, may be used (e.g. by DPE 202) to configure and/or to re-configure a composable distributed system, For example, when a user or pack provider updates information associated with a cluster profile 104, or updates a portion of cluster profile 104, or then, pack configuration information 284 may be used to obtain pack metadata management information 254 to appropriately update cluster profile 104. When information related to a pack, or pack/layer implementation is updated, then pack metadata management information 254 may be used to update information stored in pack configuration information 284 in repository 280.

If cluster profiles 104 use dynamic versioning (e.g. labels such as "Stable," or "1.16.x" or "1.16" etc.), then the version information may be checked (e.g. by an Orchestrator) at cluster deployment or cluster update time to resolve to a concrete or definitive version (e.g. "1.16.4"). For example, pack configuration information 284 may indicate that the most recent "Stable" version for a specified implementation in a cluster profile 104 is "1.16.4." Dynamic version resolution may leverage functionality provided by DPE 202 and/or Management Agent 262. As another example, when a provider or user releases a new "Stable" version for an implementation, then pack metadata management information 254 may be used to update pack configuration information 284 in repository 280 to indicate that the most recent "Stable" version for an implementation may be version "1.16.4." Pack metadata management information 254 and/or pack configuration information 284 may also include additional information relating to the implementation to enable the Orchestrator to obtain, deploy, and/or update the implementation.

In some embodiments, cluster profile management block 232 may provide and/or management agent 262 may obtain cluster specification update information 278 and the system (state and/or composition) may be reconfigured to match the updated cluster profile (e.g. as reflected in the updated system composition specification S 150). Similarly, changes to the cluster specification 180 may be reflected in cluster specification updates 278 (e.g. and in the updated system composition specification S 150), which may be obtained (e.g. by management agent 262) and the system (state and/or composition) may be reconfigured to match the updated cluster profile.

In some embodiments, cluster profile management block 232 may receive input from policy management block 234. Accordingly, in some embodiments, the cluster profile configurations and/or cluster profile layer selection menus 102 presented to a user may reflect user policies including QoS, price-performance, scaling, cost, availability, security, etc. For example, if a security policy specifies one or more parameters to be met (e.g. "security hardened"), then, cluster profile selections and/or layer implementations that meet or exceed the specified security policy parameters may be displayed to the user for selection/configuration (e.g. during cluster configuration and/or in cluster profile layer selection menu 102), when composing the distributed system/applications (e.g. using a UI). When DPE 202 is implemented as an SaaS, then policies and/or policy parameters that affect user menu choices or user cluster configuration options may be stored in a database (e.g. associated with DPE 202).

Application or application instances may be configured to run on a single VM/node, and/or placed in separate VMs/nodes in a node pool k in cluster 207-$i$. Container applications may be registered with the container registry 282 and images associated with applications may be stored as an ISO image in ISO Images 286. In some embodiments, ISO images 286 may also store bootstrap images, which may be used to boot up and initiate a configuration process for bare metal tenant nodes $270_i^{w-k}$ resulting in the configuration of a bare metal node pool k in tenant node cluster 207-$i$ as part of a composed distributed system in accordance with a corresponding system composition specification 150. Bootstrap images for a cluster $T_i$ 207-$i$ may reflect cluster specification information 180-$i$ as well as corresponding cluster profile $B_i$ 104-$i$.

The term bootstrap or booting refers to the process of loading basic program code or a few instructions (e.g. Unified Extensible Framework Interface (UEFI) or basic input-output system (BIOS) code from firmware) into computer memory, which is then used to load other software (e.g. such as the OS). The term pre-bootstrap as used herein may refers to program code (e.g. firmware) that may be loaded into memory and/or executed to perform actions prior to initiating the normal bootstrap process and/or to configure a computer to facilitate later boot-up (e.g. by loading OS images onto a hard drive etc.). ISO images 286 in repository 280 may be downloaded as cluster images 253 and/or adapter/container images 257 and flashed to tenant nodes $270_i^{w-k}$ (e.g. by an orchestrator, and/or a management agent $262_i^{w-k}$ and/or by configuration engine $281_i^{w-k}$).

In some embodiments, tenant nodes $270_i^{w-k}$ may each include a corresponding configuration engine $281_i^{w-k}$ and/or a corresponding management agent $262_i^{w-k}$. Configuration Engine $281_i^{w-k}$, which, in some instances, may be similar for all nodes $270_i^{w-k}$ in a pool k or in a cluster $T_i$ 207-$i$ may include functionality to perform actions (e.g. on behalf of a corresponding a node $270_i^{w-k}$ or node pool) to facilitate cluster/node pool configuration.

In some embodiments, configuration engine $281_i^{l-k}$ for a lead node $270_i^{l-k}$ in a node pool may facilitate interaction with management agent $262_i^{l-k}$ and with other entities (e.g. directly or indirectly) such as DPE 202, repository 280, and/or another entity (e.g. a "pilot cluster") that may be configuring lead node $270_i^{l-k}$. In some embodiments, configuration engine $281_i^{w-k}$ for a (non-lead) node $270_i^{w-k}$, w≠l may facilitate interaction with management agents $262_i^{w-k}$ and/or other entities (e.g. directly or indirectly) such as a lead node $270_i^{l-k}$ and/or another entity (e.g. a "pilot cluster") that may be configuring the cluster/node pool.

In some embodiments, management agent $262_i^{w-k}$ for a node $270_i^{w-k}$ may include functionality to interact with DPE 202 and configuration engines $281_i^{w-k}$, monitor, and report a configuration and state of a tenant node $270_i^{w-k}$, provide cluster profile updates (e.g. received from an external entity such as DPE 202, a pilot cluster, and/or a lead tenant node $270_i^{l-k}$ for a node pool k in cluster 207-$i$) to configuration engine 281-$i$. In some embodiments, management agent $262_i^{w-k}$ may be part of pre-bootstrap code in a bare metal node $270_i^{w\_k}$ (e.g. which is part of a node pool k with bare metal nodes in cluster 207-$i$), may be stored in non-volatile memory on the bare metal node $270_i^{w\_k}$, and executed in memory during the pre-bootstrap process. Management agent $262_i^{w\_k}$ may also run following boot-up (e.g. after BM nodes $270_i^{w\_k}$ have been configured as part of the node pool/cluster).

In some embodiments, tenant node(s) $270_i^{w\_k}$ where $1 \le w \le W\_k$, and W_k is the number of nodes in node pool k in cluster $T_i$ 207-$i$, may be "bare metal" or hardware nodes without an OS, that may be composed into a distributed computing system (e.g. with one or more clusters) in accordance with system composition specification 150 as specified by a user. Tenant nodes $270_i^{w\_k}$ may be any hardware platform (e.g. a cluster of rack servers) and/or VMs. For the purposes of the description below, tenant nodes are assumed to be "bare metal" hardware platforms—however, the techniques described may also applied to VMs.

The term "bare metal" (BM) is used to refer to a computer system without an installed base OS and without installed applications. In some embodiments, the bare metal system may include firmware or flash/Non-Volatile Random Access Memory (NVRAM) memory program code, which may support some operations such as network connectivity and associated protocols.

In some embodiments, a tenant node $270_i^{w\_k}$ may be configured with a pre-bootstrap code (e.g. in firmware, memory (e.g. flash memory), and/or storage). In some embodiments, the pre-bootstrap code may include a management agent $262_i^{w\_k}$, which may be configured to register with DPE 202 (e.g. over a network) during the pre-bootstrap process. For example, management agent 262 may be built over (and/or leverage) standard protocols such as "bootp". Dynamic Host Configuration Protocol (DHCP), etc. In some embodiments, the pre-bootstrap code may include a management agent 262, which may be configured to: (a) perform a local network peer-discovery and initiate formation of a node pool and/or cluster $T_i$ 207-$i$ and/or join an appropriate node pool and/or cluster $T_i$ 207-$i$; and/or (b) initiate contact with DPE 202 to initiate formation of a node pool and/or cluster $T_i$ 207-$i$ and/or join an appropriate node pool and/or cluster $T_i$ 207-$i$.

In some embodiments (e.g. where DPE 202 is provided as an SaaS, BM pre-bootstrap nodes (also termed "seed nodes") may initially announce themselves (e.g. to DPE 202 or to potential peer nodes) as "unassigned" BM nodes. Based on cluster specification information 180 (e.g. available to management agent 262-k and/or DPE 202), the nodes may be assigned to and/or initiate formation of a node pool and/or cluster $T_i$ 207-$i$ as part of the distributed system composition orchestration process. For example, management agent $262_i^k$ may initiate formation of node pool k and/or cluster $T_i$ 207-$i$ and/or initiate the process of joining an existing node pool k and/or cluster $T_i$ 207-$i$. For example, management agent $262_i^{w\_k}$ may obtain cluster images 253 from repository 280 and/or from a peer node based on the cluster specification information 180-$i$.

In some embodiments, where tenant node $270_i^{w\_k}$ is configured with standard protocols (e.g. bootp/DHCP), the protocols may be used to download the pre-bootstrap program code, which may include management agent $262_i^{w\_k}$ and/or include functionality to connect to DPE 202 and initiate registration. In some embodiments, tenant node $270_i^{w\_k}$ may register initially as an unassigned node. In some embodiments, the management agent $262_i^{w\_k}$ may: (a) obtain an IP address via DHCP and discover and/or connect with the DPE 202 (e.g. based on node registration information (DPE) 266); and/or (b) obtain an IP address via DHCP and discover and/or connect with a peer node (e.g. based on node registration information (P2P) 266).

In some embodiments, DPE 202 and/or the peer node may respond (e.g. to lead management agent $262_i^{w\_k}$ on a lead tenant node $270_i^{l\_k}$) with information including: node registration information 266, cluster specification update information 278. Cluster specification update information 278 may include one or more of: cluster specification related information (e.g. cluster specification 180-$i$ and/or information to obtain cluster specification 180-$i$ and/or information to obtain cluster images 253), a cluster profile definition (e.g. cluster profile 104-$i$ for a system composition specification S 150) for node pool k and/or a cluster associated with lead tenant node $270_i^{l\_k}$.

In some embodiments, DPE 202 and/or a peer node may respond (e.g. to management agent $262_i^{l\_k}$ on a lead tenant node $270_i^{l\_k}$) by indicating (e.g. that one or more of the other tenant nodes $270_i^{w\_k}$, w≠l are to obtain registration, cluster specification, cluster profile, and/or image information from lead tenant node $270_i^{k=l}$. Tenant nodes $270_i^{w\_k}$, w≠l that have not been designated as the lead tenant node may terminate connections with DPE 202 (if such communication has been initiated) and communicate with or wait for communication from lead tenant node $270_i^{l\_k}$. In some embodiments, tenant nodes $270_i^{w\_k}$, w≠l that have not been designated as the lead tenant node may obtain node registration information 266 and/or cluster profile updates 278 (e.g. registration, cluster specification, cluster profile and/or image information from lead tenant node $270_i^{l\_k}$ directly via P2P discovery without contacting DPE 202.

In some embodiments, a lead tenant node $270_i^{l\_k}$ may use a P2P communication to determine when to initiate formation of a node pool and/or cluster (e.g. where node pool k and/or cluster $T_i$ 207-$i$ has not yet been formed), or a tenant node $270_i^{w\_k}$, w≠l may use P2P communication to detect existence of a cluster $T_i$ 207-$i$ and lead tenant node $270_i^{l\_k}$ (e.g. where formation of node pool k and/or cluster $T_i$ 207-$i$ has previously been initiated) to join the existing cluster. In some embodiments, when no response is received from an attempted P2P communication (e.g. with a lead tenant node $270_i^{l\_k}$), a tenant node $270_i^{w\_k}$, w≠l may initiate communication with DPE 202 as an ""unassigned node" and may receive cluster specification updates 278 and/or node registration information 266 to facilitate: (a) cluster and/or node pool formation (e.g. where formation of a node pool and/or cluster has not yet been initiated); or (b) join an existing node pool and/or cluster (e.g. where formation of a node pool and/or cluster has been initiated). In some embodiments, any of the tenant nodes $270_i^{w\_k}$ may be capable of serving as a lead tenant node $270_i^{l\_k}$. Accordingly, in some embodiments, tenant nodes $270_i^{w\_k}$ in a node pool and/or cluster $T_i$ 207-$i$ may be configured similarly.

Upon registration with DPE 202 (e.g. based, in part, on functionality provided by Node Management block 224), lead tenant node $270_i^{l\_k}$ may receive system composition specification S 150 and/or information to obtain system composition specification S 150. Accordingly, lead tenant node $270_i^{l}$ may: (a) obtain a cluster specification and/or cluster profile (e.g. cluster profile 104-$i$) and/or information pertaining to a cluster specification or cluster profile (e.g. cluster profile 104-$i$), and/or (b) may be assigned to a node pool and/or cluster $T_i$ 207-$i$ and/or receive information pertaining to a node pool and/or $T_i$ 207-$i$ (e.g. based on functionality provided by cluster management block 226).

In some embodiments, (e.g. when nodes $270_i^k$ are BM nodes), medium access control (MAC) addresses associated with a node may be used to designate one or more nodes as lead nodes and/or to assign nodes to a node pool and/or cluster $T_i$ 207-$i$ based on parameters 155 and/or cluster specification 180 (e.g. based on node pool related specification information 180-$k$ for a node pool k). In some embodiments, the assignment of nodes to node pools and/or clusters, and/or the assignment of cluster profiles 104 to nodes, may be based on stored cluster/node configurations provided by the user (e.g. using node management block 224 and/or cluster management block 226). For example, based on stored user specified cluster and/or node pool configurations, hardware specifications associated with anode 270$_i^{w-k}$ may be used to assign nodes to node pools/clusters and/or to designate one or more nodes as lead nodes for a cluster (e.g. in conformance with cluster specification 180/ node pool related specification information 180-$k$).

As one example, node MAC addresses and/or another node identifier may be used as an index to obtain a corresponding node hardware specification and determine a node pool assignment and/or cluster assignment, and/or role (e.g. lead or worker) for the node. In some embodiments, various other protocols may be used to designate one or more nodes as lead/worker nodes for a node pool and/or cluster, and/or to assign nodes to node pools and/or clusters. For example, a sequence or order in which the nodes 270$_i^{w-k}$ contact DPE 207, a subnet address, IP address, etc. for nodes 270$_i^{w-k}$ may be used to assign nodes to node pools and/or clusters, and/or to designate one or more nodes as lead nodes for a cluster. In some embodiments, unrecognized nodes may be placed, at least initially, in a default or fallback node pool/cluster, and may be reassigned to (and/or may initiate formation of) another cluster upon determination of node specification and/or other node information.

In some embodiments, as outlined above, management agent 262$_i^{l-k}$ on lead tenant node 270$_i^{l-k}$ for a cluster $T_i$ 207-$i$ may receive cluster profile updates 278, which may include system composition specification S 150 (including cluster specification 180-$i$ and cluster profile 104-$i$) and/or information to obtain system composition specification S 150 specifying the user composed distributed system 200. Management agent 262$_i^{l-k}$ on lead tenant node 270$_i^{l-k}$ may use the received information to obtain a corresponding cluster configuration 288. In some embodiments, based on information in pack configuration 284 and cluster configuration information 288, and/or cluster images 253 may be obtained (e.g. by lead tenant node 270$_i^{l-k}$) from ISO images 286 in repository 280. In some embodiments, cluster images 253$_i^{l-k}$ (for a node pool k in cluster $T_i$ 207-$i$) may include OS/Kernel images. In some embodiments, lead tenant node 270$_i^{l-k}$ and/or management agent 262$_i^{l-k}$ may further obtain any other layer implementations (e.g. Kubernetes 1.14, Calico v4, etc.) including custom layer implementations/scripts, adaptor/container images 257 from ISO images 286 on repository 280. In some embodiments, management agent 262$_i^{l-k}$ and/or another portion of the pre-bootstrap code may also format the drive and build a composite image that includes the various downloaded implementations/images/ scripts and flash the downloaded images/constructs to the lead tenant node 270$_i^{l-k}$. In some embodiments, the composite image may be flashed (e.g. to a bootable drive) on lead tenant node 270$_i^{l-k}$. A reboot of lead tenant node 270$_i^{l-k}$ may then be initiated (e.g. by management agent 262$_i^{k}$).

The lead tenant node 270$_i^{l-k}$ may reboot to the OS (e.g. based on the flashed composite image, which includes the OS image) and following reboot may execute any initial custom layer implementation (e.g. custom implementation 142-$i$) scripts. For example, lead tenant node 270$_i^{l-k}$ may perform tasks such as network configuration (e.g. based on cluster specification 180 and/or corresponding node pool related specification 180-$k$), or enable kernel modules (e.g. based on cluster profile parameters 155-$i$), re-label the filesystem for selinux (e.g. based on cluster profile parameters 155-$i$), or other procedures to ready the node for operation. In addition, following reboot, tenant node 270$_i^{l-k}$/ management agent 262$_i^{l-k}$ may also run implementations associated with other default and/or custom layers. In some embodiments, following reboot, one or more of the tasks above may be orchestrated by Configuration Engine 281$_i^{l-k}$ on lead tenant node 270$_i^{l-k}$. In some embodiments, lead tenant node 270$_i^{l-k}$ and/or management agent 262$_i^{l-k}$ may further obtain and build cluster images (e.g. based on cluster configuration 288 and/or pack configuration 284 and/or cluster images 253 and/or adapter container images 257 from repository 280), which may be used to configure one or more other tenant nodes 270$_i^{w-k}$ (e.g. when another tenant node 270$_i^{w-k}$ requests node registration 266 with node 270$_i^{l-k}$ using a peer-to-peer protocol) in cluster 207-$i$.

In some embodiments, upon reboot, lead tenant node 270$_i^{l-k}$ and/or lead management agent 262$_i^{l-k}$ may indicate its availability and/or listen for registration requests from other nodes 270$_i^{w-k}$. In response to requests from a tenant node 270$_i^{w-k}$, w≠1 using P2P communication 259, lead tenant node 270$_i^{l-k}$ may provide the cluster images to tenant node 270$_i^{w-k}$, w≠1. In some embodiments, Configuration Engine 281$_i^{w-k}$ and/or management agent 262$_i^{l-k}$ may include functionality to support P2P communication 259. Upon receiving the cluster image(s), tenant node 270$_i^{w-k}$, w≠1 may build a composite image that includes the various downloaded implementations/images/scripts and may flash the downloaded images/constructs (e.g. to a bootable drive) on tenant node 270$_i^{w-k}$, w≠1.

In some embodiments, where tenant nodes 270$_i^{w-k}$, w≠1 form part of a public or private cloud, DPE 202 may use cloud adapters (not shown in FIG. 2A) to build to an applicable cloud provider image format such as Qemu Copy On Write (QCOW), Open Virtual Applications (OVA), Amazon Machine Image (AMI), etc. The cloud specific image may then uploaded to the respective image registry (which may specific to the cloud type/cloud provider) by DPE 202. Thus, in some embodiments, repository 280 may include one or more cloud specific image registries, where each cloud image registry may be specific to a cloud. In some embodiments, DPE 202 may then initiate node pool/cluster setup for cluster 207-$i$ using appropriate cloud specific commands. In some embodiments, cluster setup may result in the instantiation of lead tenant node 270$_i^{l-k}$ on the cloud based cluster, and lead tenant node 270$_i^{l}$ may support instantiation of other tenant nodes 270$_i^{w-k}$, w≠1 that are part of the node pool/cluster 207-$i$ as outlined above.

In some embodiments, upon obtaining the cluster image, the tenant node 270$_i^{l-k}$ may reboot to the OS (based on the received image) and following reboot may execute any initial custom layer implementation (e.g. custom implementation 142-$i$) scripts and perform various configurations (e.g. network, filesystem, etc.). In some embodiments, one or more of the tasks above may be orchestrated by Configuration Engine 281$_i^{w-k}$. After configuring the system in accordance with system composition specification S 150, as outlined above, tenant nodes 270$_i^{w-k}$ may form part of node pool k/cluster 207-$i$ in distributed system as composed by a user. The process above may be performed for each node pool and cluster. In some embodiments, the configuration of node pools in a cluster may be performed in parallel. In some embodiments, when the distributed system includes a plurality of clusters, clusters may be configured in parallel.

In some embodiments, management agent $262_i^{l\_k}$ on a lead tenant node $270_i^{l\_k}$ may obtain state information $268_i^{w\_k}$ and cluster profile information $264_i^{w\_k}$ for nodes $270_i^{w\_k}$ in a node pool k in cluster 207-$i$ and may provide that information to DPE 202. The information (e.g. state information $268_i^{w\_k}$ and cluster profile information $264_i^{w\_k}$) may be sent periodically, upon request (e.g. by DPE 202), or upon occurrence of one or more state change events to DPE 202 (e.g. as part of cluster specification updates 278). In some embodiments, when the current state (e.g. based on state information $268_i^{w\_k}$) does not correspond to a declared (or desired) state (e.g. as outlined in system composition specification 150) and/or system composition does not correspond to a declared (or desired) composition (e.g. as outlined in system composition specification 150), then DPE 202 and/or management agent $262_i^{l\_k}$ may take remedial action to bring the system state and/or system composition into compliance with system composition specification 150. For example—if a system application is accidentally or deliberately deleted, then DPE 207 and/or management agent $262_i^{l}$ may reinstall (or be instructed to reinstall) the deleted system application during a subsequent reconciliation. As another example, changes to the OS layer implementation, such as the deletion of a kernel module, may result in the module being reinstalled. As a further example, system composition specification 150 (or node pool specification portion 180-$k$ of cluster specification 180) may specify a node count for a master pool, and a node count for the worker node pools. When a current number of running nodes deviates from the count specified (e.g. in cluster specification 180) then, DPE 207 and/or management agent $262_i^{l\_k}$ may add or delete nodes to bring number of nodes into compliance with system composition specification 150.

In some embodiments, composable system may also facilitate seamless changes to the composition of the distributed system. For example, cluster specification updates 278 may provide: (a) user changes to cluster configurations (e.g. via cluster management block), and/or (b) cluster profile changes/updates (e.g. change to security layer 131 in cluster profile 104, addition/deletion of layers) to management agent $262_i^{w\_k}$ on node $270_i^{w\_k}$. Cluster specification updates 278 may reflect a new or changed desired system state, which may be declaratively applied to the cluster (e.g. by management agent $262_i^{w\_k}$ using configuration engine $281_i^{w\_k}$). In some embodiments, the updates may be applied in a rolling fashion to bring the system in compliance with the new declared state (e.g. as reflected by cluster specification updates 278). For example, nodes 270 may be updated one at a time, so that other nodes can continue running thus ensuring system availability. Thus, the composable distributed system and applications executing on the composable distributed system may continue running as the system is updated. In some embodiments, cluster specification updates 278 may specify that upon detection of any failures, or errors, a rollback to a prior state (e.g. prior to the attempted update) should be initiated.

Disclosed embodiments thus facilitate the specification and automated deployment of end-to-end composable distributed systems, while continuing to support orchestration, deployment, and scaling of applications, including containerized applications.

Figure 2B:
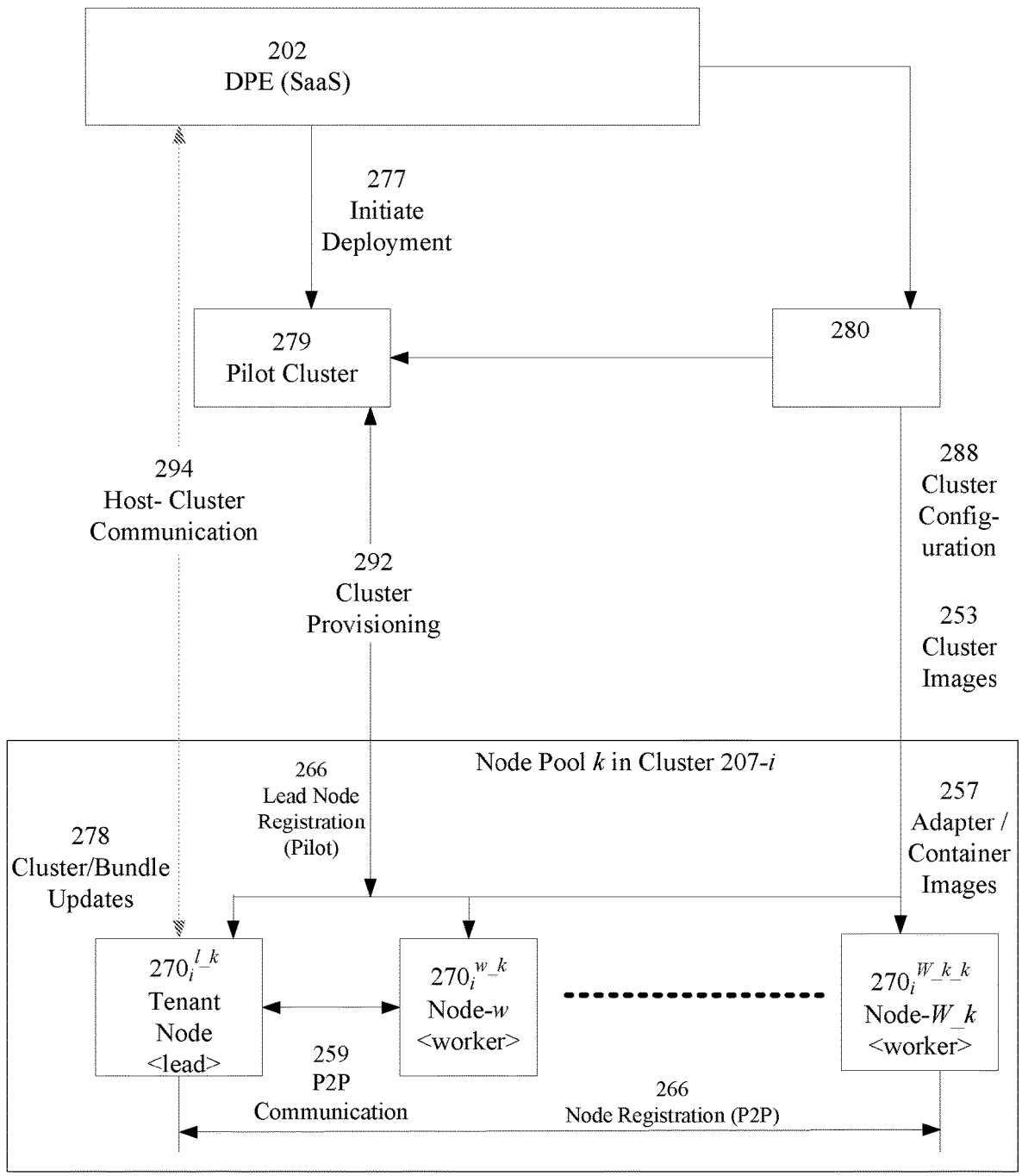
FIG. 2B shows another example architecture to facilitate composition of a distributed system comprising one or more clusters.

FIG. 2B shows another example architecture 275 to facilitate composition of a distributed system comprising one or more clusters 207. The architecture 275 shown in FIG. 2B supports the specification, orchestration, deployment, monitoring, and updating of a composable distributed system and of applications running on the composable distributed system. In some embodiments, composable distributed system may be a distributed computing system, where one or more of the functional units may be cloud-based. In some embodiments, the composable distributed system may be implemented using some combination of: cloud based systems and/or services, and/or physical hardware.

As shown in FIG. 2B, DPE 202 may be provided in the form of a SaaS and may include functionality and/or functional blocks similar to those described above in relation to FIG. 2A. For example, DPE 202 may serve as a control block and provide node/cluster management, user management, role based access control (RBAC), cluster management including cluster profile management, monitoring, reporting, and other capabilities to facilitate composition of distributed system 275.

DPE 202 may be used (e.g. by a user) to store cluster configuration information 288, pack configuration information 284 (e.g. including layer implementation information, adapter information, cluster profile location information, cluster profile parameters 155, and content), ISO images 286 (e.g. cluster images, BM bootstrap images, adapter/container images, management agent images) and container registry 282 (not shown in FIG. 2B) in repository 280 in a manner similar to the description above for FIG. 2A.

In some embodiments, DPE 202 may initiate composition of a cluster 207-$i$ that forms part of the composable distributed system by sending an initiate deployment command 277 to pilot cluster 279. For example, a first "cluster create" command identifying cluster 207-$i$, a cluster specification 150, and/or a cluster image (e.g. if already present in repository 280) may be sent to pilot cluster 279. In some embodiments, a Kubernetes "kind cluster create" command or variations thereof may be used to initiate deployment. In some embodiments, cluster specification 150 may be sent to the pilot cluster 279. In embodiments, where one or more clusters 207 or node pools form part of a private infrastructure, an authentication mechanism, unique key, and/or identifier may be used by a pilot cluster 279 (and/or a pilot sub-cluster) within the private infrastructure to obtain the relevant cluster specification 150 from DPE 202. Thus, pilot cluster 279 may include one or more pilot sub-clusters, which may coordinate to deploy the distributed system in accordance with system composition specification S 150.

Pilot cluster 279 may include one or more nodes that may be used to deploy a composable distributed system comprising node pool k cluster 207-$i$. In some embodiments, pilot cluster 279 (or a pilot sub-cluster) may be co-located with the to-be-deployed composable distributed system comprising node pool k in cluster 207-$i$. In some embodiments, one or more of pilot cluster 279 and/or repository 280 may be cloud based.

In embodiments where cluster 207-$i$ forms part of a public or private cloud, pilot cluster 279 may use system composition specification 150 (e.g. cluster configuration 288, cluster specification 180/node pool parameters 180-$k$, cluster profile 104, etc.) to build and store appropriate cluster images 253 in the appropriate cloud specific format (e.g. QCOW, OVA, AMI, etc.). The cloud specific image may then be uploaded to the respective image registry (which may specific to the cloud type/cloud provider) by pilot cluster 279. In some embodiments, lead node(s) $270_i^{l\_k}$ for node pool k in cluster 207-$i$ may then be instantiated (e.g. based on the cloud specific images). In some embodiments, upon start up lead nodes $270_i^{l\_k}$ for node pool k in cluster 207-$i$ may obtain the cloud specific images and cloud specification 150, and initiate instantiation of the worker nodes $270_i^{w\_k}$, w≠l. Worker nodes $270_i^{w\_k}$, w≠l may obtain cloud specific images and cloud specification 150 from lead node(s) $270_i^{l\_k}$.

In embodiments where anode pool k in cluster 207-$i$ includes a plurality of BM nodes $270_i^{w\_k}$, upon receiving "initiate deployment" command 277 pilot cluster 279 may use system composition specification 150 (e.g. cluster specification 180, node pool parameters 180-$k$, cluster profile 104, etc.) to build and store appropriate ISO images 286 in repository 280. A first BM node may upon boot-up (e.g. when in a pre-bootstrap configuration) may register with pilot cluster 279 (e.g. by exchanging lead node registration (Pilot) 266 messages) and be designated as a lead node $270_i^{l\_k}$ (e.g. based on MAC addresses, IP address, subnet address, etc.). In some embodiments, pilot cluster 279 may initiate the transfer of, and/or the (newly designated) lead BM node $270_i^{l\_k}$ may obtain, cluster images 253, which may be flashed (e.g. by management agent $262_i^{l\_k}$ in pre-bootstrap code running on $270_i^{l\_k}$) to lead BM node $270_i^{l\_k}$. In some embodiments, the cluster images 253 may be flashed to a bootable drive on lead BM node $270_i^{l\_k}$. A reboot of lead BM node $270_i^{l\_k}$ may be initiated and, upon reboot, lead BM node $270_i^{l\_k}$ may obtain cluster specification 150 and/or cluster images 253 from repository 280 and/or pilot cluster 279 (e.g. via cluster provisioning 292). The cluster specification 150 and/or cluster images 253 obtained (following reboot) by lead node $270_i^{l\_k}$ from repository 280 and/or pilot cluster 279 may be used to provision additional nodes $270_i^{w\_k}$, w≠l.

In some embodiments, one or more nodes $270_i^{w\_k}$, w≠l, may upon boot-up (e.g. when in a pre-bootstrap configuration) register with lead node $270_i^{l\_k}$ (e.g. using internode (P2P) communication 259 and may be designated as a worker node (or as another lead node based on corresponding node pool specification 180-$k$). In some embodiments, lead node $270_i^{l\_k}$ may initiate the transfer of, and/or BM node $270_i^{w\_k}$ may obtain, cluster images 253, which may be flashed (e.g. by management agent $262_i^{w\_k}$ in pre-bootstrap code running on $270_i^{w\_k}$) to the corresponding BM node $270_i^{w\_k}$. In some embodiments, the cluster images 253 may be flashed to a bootable drive on BM node $270_i^{w\_k}$ (e.g. following registration with lead node $270_i^{l\_k}$). A reboot of BM node $270_i^{w\_k}$ may be initiated and, upon reboot, BM node $270_i^{w\_k}$ may join (and form part of) node pool k in cluster 207-$i$ with one or more lead nodes $270_i^{l\_k}$ in accordance with system composition specification 150. In some embodiments, upon reboot, nodes $270_i^{w\_k}$ and/or management agent $262_i^{w\_k}$ may install any additional layer implementations, system addons, and/or system applications (if not already installed) in order to reflect cluster profile 104-$i$.

Figure 3:
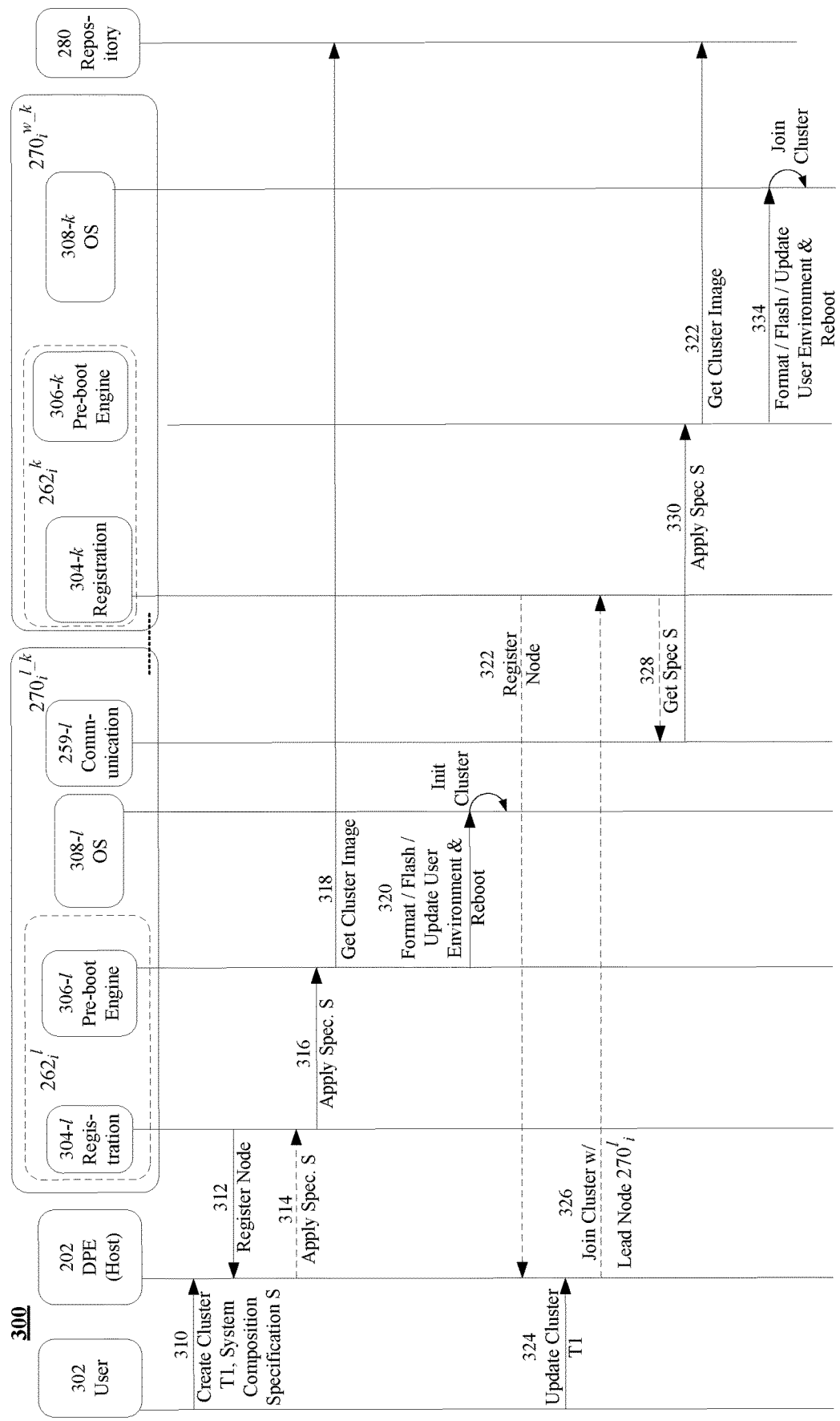
FIG. 3 shows a flow diagram illustrating deployment of a composable distributed application on a distributed system in accordance with some disclosed embodiments.

FIG. 3 shows a flow diagram 300 illustrating deployment of a composable distributed system in accordance with some disclosed embodiments. In FIG. 3, the deployment of a nodes in a node pool k in a cluster forming part of composable distributed system is shown. The method and techniques disclosed in FIG. 3 may be applied to other node pools for the cluster, and to other clusters in the composable distributed system in a similar manner.

In FIG. 3, DPE 202 may be implemented based on a SaaS model. In embodiments where a SaaS model is used, user management of nodes, clusters, cluster profiles, policies, applications, etc., may be provided as a service over a network (e.g. the Internet). For example, a user 302 may log in to DPE 202 to configure the system and apply changes.

In FIG. 3, management agent $262_i^{l\_k}$ for a tenant node $270_i^{l\_k}$ is shown as comprising registration block 304-$l$ and pre-boot engine block 306-$l$. Similarly, for a tenant node $270_i^{w\_k}$ is shown as comprising registration block 304-$k$ and pre-boot engine block 306-$k$.

In the description, for simplicity and ease of description, when there is no ambiguity, cluster subscript i and node superscript w (and on occasion—node pool superscript k), have been omitted when referring to functional blocks associated with a node w and cluster i. For example, registration block $304_i^{w\_k}$ associated with a node w (in a cluster i) is referred to simply as block 304-$k$. Similarly, lead registration block $304_i^{l\_k}$ associated with a lead node l (in a cluster i) is referred to simply as block 304-$l$. The above blocks are merely exemplary and the functions associated with the blocks may be combined or distributed in various other ways.

In 310, Create Cluster may be used (e.g. by user 302) to specify a cluster (e.g. a cluster 207-$i$) and associate the node pool and/or cluster with tenant nodes (e.g. tenant nodes $270_i^{w\_k}$) based on a cluster specification S 150 (which may include cluster profile 104 and a corresponding cluster specification 180, which may include node pool specifications 180-$k$ for the cluster). For example, a system composition specification 150 may include cluster profile 104 and cluster specification 180 (e.g. created using functionality provided by cluster management block 226 and/or node management block 224). Cluster profile 104 may include corresponding cluster parameters 155, while corresponding cluster specification 180 may include node pool specification 180-$k$ for node pools k in the cluster. System composition specification 150 may be used to compose and configure the cluster. In some embodiments, a cluster may take the form of a single node pool. Thus, the description in FIG. 3 may also apply to individual node pools that form part of a cluster.

The cluster (which may take the form of anode pool) is shown as "T1" in FIG. 3, where T1={nodes $270_i^w | 1 \leq w \leq W$}, where W is the number of nodes in the cluster. System composition specification S 150 may also include cluster profiles (e.g. profile 104-$i$, which may be created using functionality associated with cluster profile management block 232). System composition specification S 150 may specify a user composed distributed system including applications to be deployed. In some embodiments, system composition specification may be used to automatically compose and maintain a distributed system comprising one or more clusters using a declarative model.

In some instances, one or more tenant nodes $270_i^w$ may initially take the form of bare metal nodes, which may be composed into a distributed system based on system composition specification S 150. System composition specification S 150 may include cluster profile 104-$i$, which may comprise one or more layers, which may be default (or system provided) and/or custom (user defined), where each layer may be associated with a corresponding implementation (e.g. "Ubuntu Core 18" 107 corresponding to OS layer 106, and/or implementation Custom-m corresponding to custom layer 136-$m$). In some embodiments, a cluster profile 104 may include and/or be associated with pack configuration (e.g. pack configuration information 284) indicating locations of images and other information to obtain and/or configure implementations specified in the cluster profile. In some embodiments, the cluster profile (e.g. cluster profile 104) may be stored in a JSON, YAML, or any other appropriate domain specific language file. Clusters, tenant nodes associated with clusters, and/or cluster profiles may be updated or changed dynamically (e.g. by the user) by appropriate changes to the system composition specification S 150. In some embodiments, the composed distributed system may be declarative in nature so that changes/updates may reflect a new desired system state, and, in response to the changes/updates, deviations (relative to system composition specification S 150) may be monitored and the system composition and/or state may be automatically brought into compliance with system composition specification S 150.

In 312, a Register Node request may be received by DPE 202 from registration block 304-$l$ associated with management agent $262_i^l$ on tenant node $270_i^l$. In some embodiments, tenant node $270_i^l$ may be configured (or pre-configured) with pre-bootstrap code (e.g. in firmware, memory (e.g. flash memory), and/or storage), which may include corresponding management agent $262_i^l$. As outlined above, management agent $262_i^l$ may include corresponding registration block 304-$l$. In some embodiments, management agent $262_i^l$ (which may be built over bootp and/or DHCP) may be configured to initiate the registration request using registration block 304-$l$ to register with DPE 202 (e.g. over a network) during the pre-bootstrap process. In some embodiments, where tenant node $270_i^l$ is configured with standard protocols (e.g. bootp/DHCP), these protocols may be used to download the pre-bootstrap program code (not shown in FIG. 3), which may include management agent $262_i^l$ and registration block 304-$l$, and/or include functionality to connect to DPE 202 and initiate registration. In some embodiments, registration block 304-$l$ may register tenant node $270_i^l$ initially as an unassigned node. In some embodiments, (a) the first node $270_i^k$ in a cluster to request registration, or (b) the tenant node $270_i^k$ whose request is first processed by DPE 202, may be designated as a lead tenant node—indicated here as lead tenant node $270_i^l$, for some k=l. In some embodiments, lead node designation may be based on MAC addresses, IP addresses, subnet addresses, etc.

In 314, DPE 202 may reply to the registration request from registration block 304-$l$ on tenant node $270_i^l$ with an Apply Specification S response (shown as "Apply Spec. S" in FIG. 3), where the Apply Specification S response may include a specification identifier (e.g. S). In some embodiments, the Apply Specification S response may further include node registration information (e.g. for node $270_i^l$), a cluster specification 180-$i$ associated with the node, and a cluster profile specification 104-$i$.

In instances where the Register Node request in 312 is from a registration block 304-$k$ on a tenant node $270_i^k$, k≠l, which is not designated as lead tenant node $270_i^l$, then the Apply Specification S response may include information pertaining to the designated lead tenant node $270_i^l$, and/or indicate that system composition specification information may be obtained (e.g. by tenant node $270_i^k$, k≠l) from lead tenant node $270_i^l$ (as outlined below in steps 322 onward).

In 316, registration block 304-$l$ may modify and/or forward the Apply Specification S response to pre-boot engine block 306-$l$, which may also form part of management agent $262_i^l$ on tenant node $270_i^l$.

In 318, pre-bootstrap engine block 306-$l$ may use the information (e.g. in system composition specification S 150 that specifies the user composed distributed system) to download corresponding information from repository 280. For example, pre-boot engine block 306-$l$ may obtain cluster configuration 288, cluster images 253 (FIG. 2A), pack configuration information 284 (FIG. 2A) (e.g. Ubuntu Core 18 meta-data 109, Vmkernel-4.2-secure metadata 114, etc.), and/or adapter/container images 257 from repository 280. In some embodiments, cluster images 253 may include layer implementations (e.g. Ubuntu Core 18.04.03) and parameters associated with the layer implementations. In some embodiments, cluster images 253 may form part of ISO images 286 in repository 280.

Referring to FIG. 3, in some embodiments, in 320, pre-bootstrap engine block 306-1 may: (a) format the drive; (b) build a composite image based on cluster image 253 that includes the various downloaded implementations/images/scripts and management agent $262_i^l$; (c) flash the downloaded images/constructs to a bootable drive on lead tenant node $270_i^l$; and (d) initiate a reboot of lead tenant node $270_i^l$.

Upon reboot of lead tenant node $270_i^l$, OS block 308-$l$ may run any initialization scripts and perform actions to initialize and set up the cluster associated with lead node $270_i^l$. For example, in an environment where Kubernetes serves as the orchestrator, the "kubeadm init" command may be run. Kubeadm is a tool that facilitates cluster creation and operation. The Kubeadm "init" command initiates a "control plane" on the lead tenant node $270_i^l$. In instances where there are more than one lead nodes, the first lead node may use the "kubeadm init" command to create the cluster, while lead nodes that boot up subsequent to the first lead node may use a 'kubeadmin join' command to join the pre-existing cluster. In some embodiments, following initialization (e.g. via kubeadm init) of the first lead node $270_i^l$, configuration engine block 281-$l$ may be operational on the first lead tenant node $270_i^l$.

In 322, registration block 304-$k$ on tenant node $270_i^k$ (k≠l), may initiate registration by sending a Register Node request to DPE 202. In the example of FIG. 3, tenant node $270_i^k$ (k≠l) is shown as being part of cluster T1 (e.g. based on system composition specification S 150.) Accordingly, in the example of FIG. 3, in 326, DPE 202 may respond to registration block 304-$k$ on tenant node $270_i^k$ (k≠l) with a "join cluster T1" response indicating that tenant node $270_i^k$ (k≠l) is to join cluster T1. The join cluster T1 response to registration block 304-$k$ on tenant node $270_i^k$ (k≠l) may include information indicating that lead tenant node $270_i^l$ is the lead node, and also include information to communicate with lead tenant node $270_i^l$. Further, in some embodiments, join cluster T1 response to registration block 304-$k$ on tenant node $270_i^k$ (k≠l) may indicate that cluster profile information (e.g. for cluster profile B1 associated with lead tenant node $270_i^l$) may be obtained from lead tenant node $270_i^l$.

In 328, upon receiving the "join cluster T1" response, registration block 304-$k$ on tenant node $270_i^k$ (k≠l) may send a "Get Specification S" (shown as "Get Spec S" in FIG. 3) request via (P2P) communication agent block 259-1 to lead tenant node $270_i^l$ In 330, lead tenant node $270_i^l$ may respond (e.g. via P2P communication 259) on with an Apply Specification S response, where the Apply Specification S response may include a specification identifier (e.g. S). In some embodiments, the Apply Specification S response may further include node registration information (e.g. for node $270_i^k$), a cluster specification 180 associated with the node, and a cluster profile specification 104-$i$. In some embodiments, Specification S information may be received by pre-boot engine block 306-$k$ (e.g. directly, or via forwarding by registration block 304-$k$).

In 332, pre-boot engine block 306-$k$ may use information in system composition specification S 150 and any other information received in 330 to download corresponding OS implementations and images from repository 280. For example, pre-boot engine block 306-$k$ may obtain cluster images 253 (FIG. 2A), pack configuration information 284

(FIG. 2A) (e.g. Ubuntu Core 18 meta-data 109, Vmkernel-4.2-secure metadata 114, etc.), and/or adapter/container images 257 from repository 280. In some embodiments, cluster images 253 may include layer implementations (e.g. Ubuntu Core 18.04.03) and parameters. In some embodiments, cluster images 253 may form part of ISO images 286 in repository 280.

In 334, pre-boot engine block 306-$k$ may (a) format the drive; (b) build a composite image based on cluster image 253 that includes the various downloaded implementations/images/scripts and management agent $262_i^k$; (c) flash the downloaded images/constructs to a bootable drive on tenant node $270_i^k$; and (d) initiate a reboot of tenant node $270_i^k$.

Upon reboot of tenant node $270_i^k$, OS block 308-$k$ may run any initialization scripts and perform actions to initialize and set up the cluster associated with lead node $270_i^l$ For example, in an environment where Kubernetes serves as the orchestrator, the "kubeadm join" command may be run. The Kubeadm "join" command initiates the process to join an existing cluster. For example, cluster information may be obtained from API server 272-$l$ and the process to join the cluster may start. After authentication, tenant node $270_i^k$ may use its assigned node identity to establish a connection to API server 272-$l$ on lead node $270_i^l$.

In some embodiments, steps corresponding to steps 322-324 and "join cluster" may be repeated for each tenant node $270_i^k$ that joins cluster T1. The steps above in FIG. 3 may also be performed to obtain various node pools k that form part of the cluster. Further, process flow 300 may be repeated for each new cluster (e.g. T2, T3, etc.) that may form part of distributed system (e.g. as specified in system composition specification S 150). For example, additional clusters (e.g. T2, T3 . . . etc.) with other lead nodes may be created and deployed, where each cluster may utilize distinct corresponding cluster profiles.

Thus, a distributed system D may be automatically composed based on a system composition specification S 150, which may be expressed as $S=\{(C_i, B_i)|1 \leq i \leq N\}$, where $C_i$ is the cluster specification describing the configuration of the $i^{th}$ cluster, and $B_i$ is the cluster profile associated with the $i^{th}$ cluster, and N is the number of clusters. Each cluster $Q_i$ may be composed in accordance with cluster specification $C_i$ and cluster profile $B_i$ and may be associated with one or more node pools and at least one corresponding lead node $270_i^l$. In some embodiments, nodes within a node pool in a cluster $Q_i$ may be similar (e.g. similar BM/VM specifications), whereas the composition of nodes in different node pools $270_i^{w-k} \in Q_i$ and $270_i^{w-j} \in Q_i$, j≠k may differ. Further, the composition of cluster $Q_i$ and cluster $Q_r$, i≠r may also differ. Moreover, one or more clusters $Q_i$ or node pools in distributed system D may be composed over bare metal hardware. In addition, two node pools may include BM hardware with different configurations. Further, the distributed system (e.g. as specified in system composition specification S 150) may comprise a combination of private and public clouds. In addition, by implementing the composable distributed system declaratively, the distributed system composition and state may remain compliant with system composition specification 150.

Figure 4:
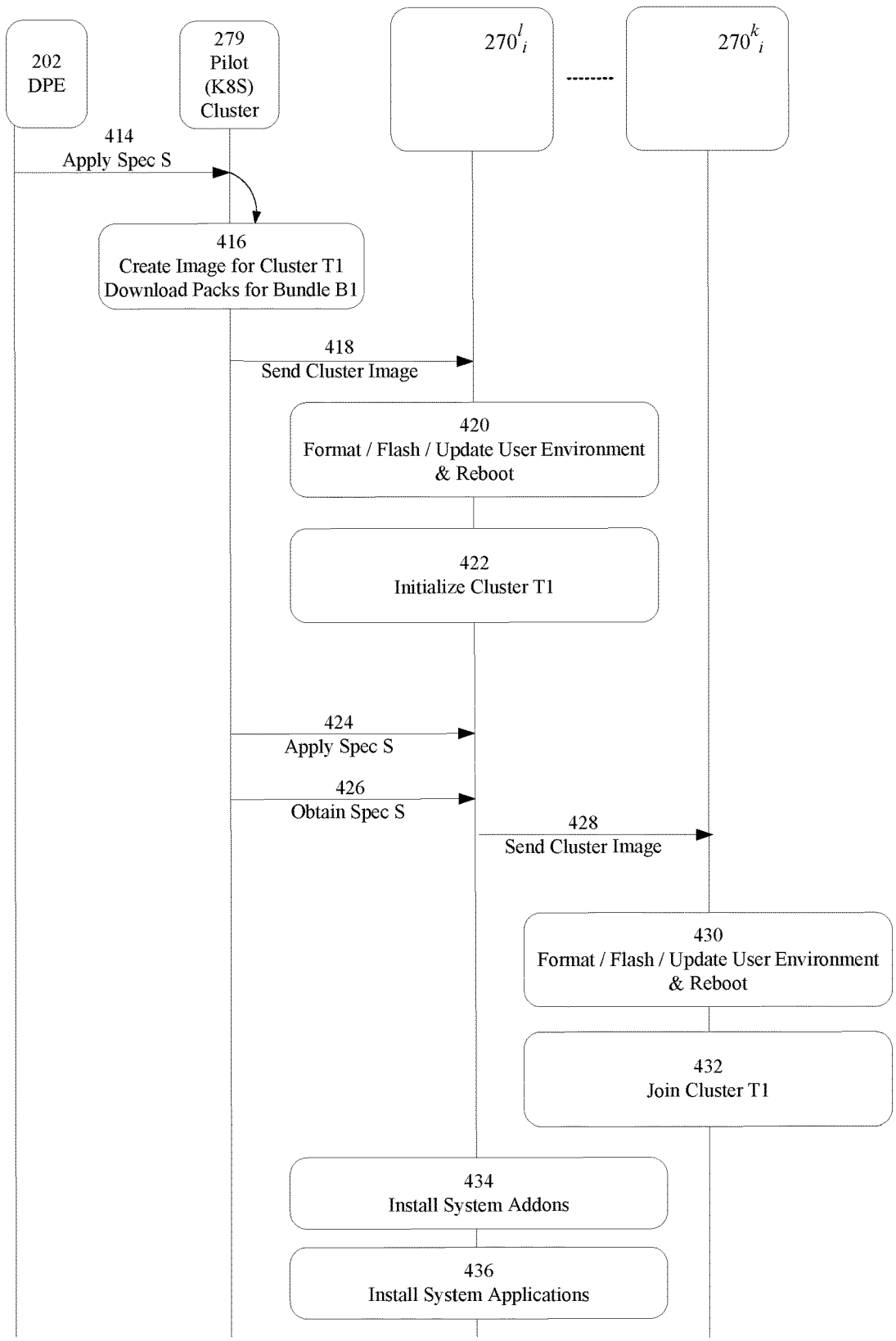
FIG. 4 shows an example flow diagram illustrating deployment of a cluster on a composable distributed system in accordance with some disclosed embodiments.

FIG. 4 shows an example flow diagram 400 illustrating deployment of a cluster on a composable distributed system in accordance with some disclosed embodiments.

In FIG. 4, pilot cluster 279 may be implemented as a Kubernetes cluster (shown as "K8S Cluster" in FIG. 4). Pilot cluster 279 may include one or more nodes that may be used to deploy a composable distributed system comprising one or more clusters 207-$i$. In some embodiments, pilot cluster 279 may be co-located with the to-be-deployed composable distributed system comprising cluster 207-$i$. In some embodiments, one or more of pilot cluster 279 and/or repository 280 may be cloud based. In some embodiments, pilot cluster may be operationally and/or communicatively coupled to DPE 202.

In FIG. 4, in 414, pilot cluster 279 may receive an "Apply Specification S" request (shown as "Apply Spec. S" in FIG. 4) from DPE 202. In some embodiments, the Apply Specification S request may include a specification identifier (e.g. S) and/or a URL to obtain the system composition specification S 150. In some embodiments, the Apply Specification S request may further include a cluster specification 180-$i$ and a cluster profile specification 104-$i$. For example, DPE 202 may initiate composition of a cluster T1 that forms part of the composable distributed system by sending a first "Apply Specification S" command identifying cluster T1, a cluster specification 180, and/or a cluster image (e.g. if already present in repository 280).

In some embodiments, the "Apply Specification S" command may include or take the form of a Kubernetes "kind cluster create" command or a variation thereof. In some embodiments, system composition specification S 150 may be sent to the pilot cluster using a Custom Resource Definition (CRD). CRDs may be used to extend and customize the native Kubernetes installation. In embodiments, where one or more clusters 207 form part of a private infrastructure, an authentication mechanism, unique key, and/or identifier may be used (e.g. prior to step 414) by a pilot cluster 279 (and/or a pilot sub-cluster) within the private infrastructure) to indicate a relevant system composition specification S 150 from DPE 202. Thus, pilot cluster 279 may include one or more pilot sub-clusters, which may coordinate to deploy the distributed system in accordance with system composition specification S 150.

In 416, pilot cluster 279 may use cluster specification 180-$i$ and cluster profile 104-$i$ in system composition specification S 150 to obtain pack configuration information 284 and/or ISO images 286 (e.g. from repository 180) and build cluster image 253 for cluster T1.

In block 418, pilot cluster 279 may initiate cluster deployment by sending cluster image 253 to a lead tenant node $270_i^l$. For example, when cluster T1 includes a plurality of BM nodes $270_i^k$ configured with pre-bootstrap code, then, upon bootup, a BM node that registers (not shown in FIG. 4) with pilot cluster 279 may be designated as lead BM node $270_i^l$ (e.g. based on MAC addresses, IP address, subnet address, etc.) and pilot cluster 279 may send cluster image 253 to lead BM node $270_i^l$.

In 418, pilot cluster 279 may initiate the transfer of, and/or the (newly designated) lead BM node $270_i^l$ may obtain, cluster images 253.

In 420, a bootable drive on lead BM node $270_i^l$ may be formatted, cluster images 253 may be flashed (e.g. by management agent $262_i^l$ in pre-bootstrap code running on $270_i^l$) to lead BM node $270_i^l$, and the user environment may be updated to reflect node status. In some embodiments, the cluster images 253 may be flashed to a bootable drive on lead BM node $270_i^l$. Further, in 420, a reboot of lead BM node $270_i^l$ may be initiated and, upon reboot, in 422 lead BM node $270_i^l$ may initialize cluster T1. For example, if lead BM node $270_i^l$ corresponds to the first lead BM node, then, lead BM node may initialize cluster T1 using a kubeadm init command.

In 424, lead BM node $270_i^l$ may receive a further "Apply Specification S" or similar command in relation to cluster T1 (e.g. to indicate that worker nodes for the cluster are to be instantiated and configured).

In 426, (following receipt of the "Apply Specification S" command in 424), lead BM node $270_i^l$ may obtain cluster specification 150 and/or cluster images 253 from pilot cluster 279. The cluster specification 150 and/or cluster images 253 obtained in 426 by lead node $270_i^l$ from pilot cluster 279 may be used to provision additional nodes $270_i^k$, k≠l.

In 428, lead BM node $270_i^l$ may initiate node deployment for additional nodes $270_i^k$, k≠l by sending cluster image 253 to a worker BM node $270_i^k$. For example, when a BM nodes $270_i^k$ configured with pre-bootstrap code boots up, then, upon bootup, a BM node $270_i^k$ may register (not shown in FIG. 4) with lead BM node $270_i^l$, which may send cluster image 253 to BM node $270_i^k$. Accordingly, in 428, lead BM node $270_i^l$ may initiate the transfer of, and/or BM node $270_i^k$ may obtain, cluster images 253.

In 430, a bootable drive on lead BM node $270_i^k$ may be formatted, cluster images 253 may be flashed (e.g. by management agent $262_i^k$ in pre-bootstrap code running on $270_i^k$) to BM node $270_i^k$, and the user environment may be updated to reflect node status. In some embodiments, the cluster images 253 may be flashed to a bootable drive on BM node $270_i^k$.

Further, in 430, a reboot of BM node $270_i^k$ may be initiated and, upon reboot, in 432 BM node $270_i^k$ may join cluster T1. For example, a worker node or second lead node $270_i^k$ may join existing cluster T1 using a kubeadm join command.

In some embodiments, in 434, lead node nodes $270_i^l$ (and/or management agent $262_i^l$ on lead node $270_i^k$) may optionally install any additional system addons. In 436, lead node nodes $270_i^l$ (and/or management agent $262_i^l$ on lead node $270_i^k$) may optionally install any additional system layer implementations, (if not already installed) in order to reflect cluster profile 104-i. In subsequent steps (not shown in FIG. 4), other nodes $270_i^k$, k≠l may also optionally install system addons and/or system applications. System addons may include one or more of: a container storage interface (CSI) and/or a container network interface (CNI), etc. System applications may include one or more of: monitoring applications, logging applications, etc. The steps above shown in FIG. 4 may also be applied to nodes that are to form a node pool in a cluster. Multiple node pools for a cluster may be instantiated (e.g. in parallel) using the approach described in FIG. 4.

Figure 5:
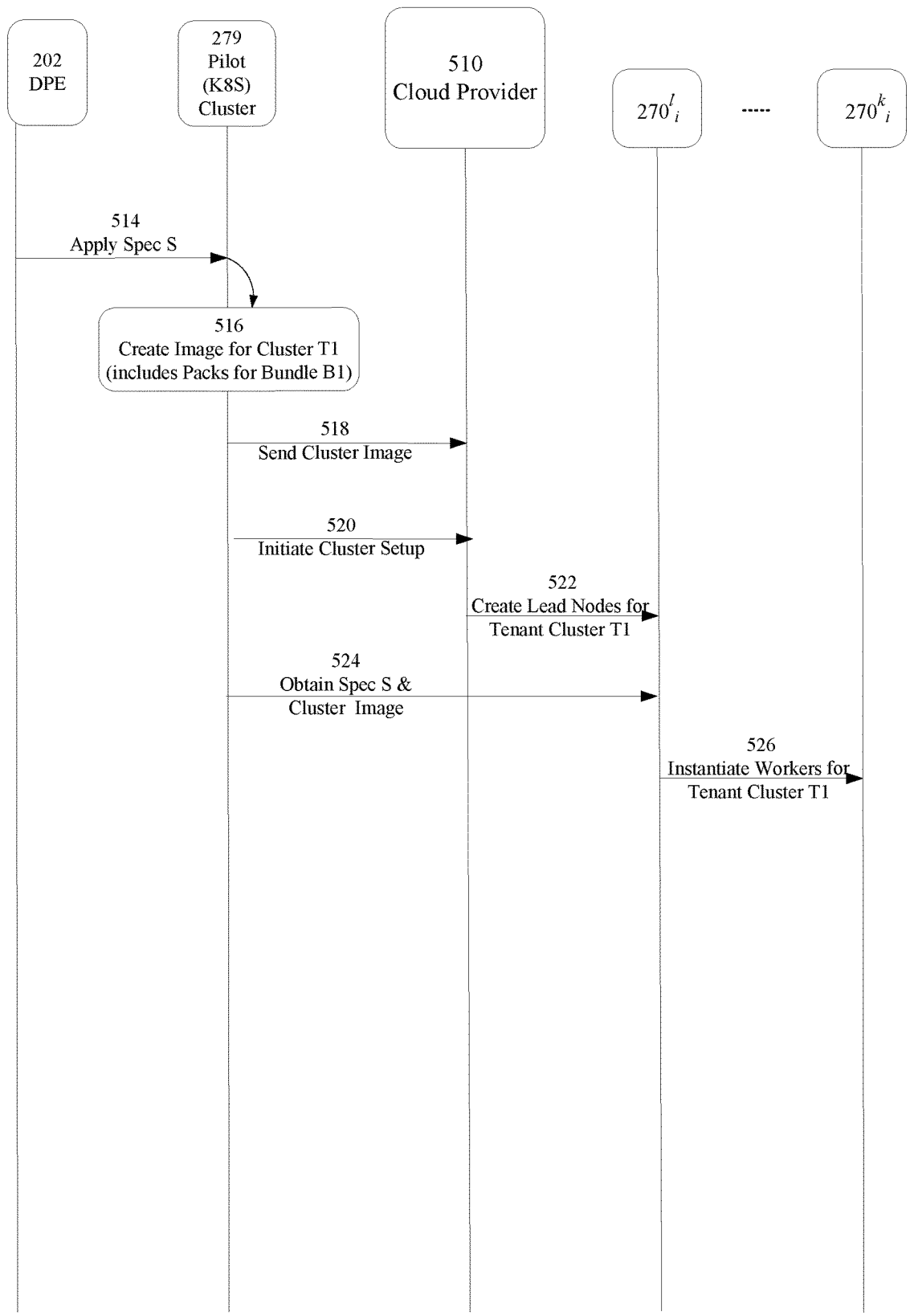
FIG. 5 shows an example flow diagram illustrating deployment of a cloud based VM cluster for a composable distributed system in accordance with some disclosed embodiments.

FIG. 5 shows an example flow diagram 500 illustrating deployment of a cloud based VM cluster for a composable distributed system in accordance with some disclosed embodiments.

In FIG. 5, pilot cluster 279 may be implemented as a Kubernetes cluster (shown as "K8S Cluster" in FIG. 5). Pilot cluster 279 may include one or more nodes that may be used to deploy a composable distributed system comprising one or more clusters 207-i. In some embodiments, one or more of pilot cluster 279 and/or repository 280 may be cloud based. In some embodiments, pilot cluster may be operationally and/or communicatively coupled to DPE 202.

In FIG. 5, in 514 pilot cluster 279 may receive an "Apply Specification S" request (shown as "Apply Spec. S" in FIG. 5) from DPE 202. In some embodiments, the Apply Specification S request may include a specification identifier (e.g. S) and/or a URL to obtain the system composition specification S 150. In some embodiments, the Apply Specification S request may further include a cluster specification 180-i and a cluster profile specification 104-i. For example, DPE 202 may initiate composition of a cluster T1 that forms part of the composable distributed system by sending a first "Apply Specification S" command identifying cluster T1, a cluster specification 180, and/or a cluster image (e.g. if already present in repository 280).

In some embodiments, the "Apply Specification S" command may include or take the form of a Kubernetes "kind cluster create" command or a variation thereof. In some embodiments, system composition specification S 150 may be sent to the pilot cluster using a Custom Resource Definition (CRD). CRDs may be used to extend and customize the native Kubernetes installation.

In 516, pilot cluster 279 may use cluster specification 180-i and cluster profile 104-i in system composition specification S 150 to obtain pack configuration information 284 and/or ISO images 286 (e.g. from repository 180) and build cluster image 253 for cluster T1. In FIG. 5, where the cluster T1 forms part of a cloud (public or private), pilot cluster 279 may use cluster specification 150 (e.g. cluster configuration, node pool parameters, cluster profile 104, etc.) to build and store appropriate cluster images 253 in the appropriate cloud specific format (e.g. QCOW, OVA, AMI, etc.). For example, system composition specification S 150 and/or cluster specification 180 may indicate that the cluster is to deployed on an Amazon AWS cloud. In some embodiments, cloud adapters, which may run on pilot cluster 259 and/or invoked by pilot cluster 279 (e.g. via application programming interfaces (APIs)) may be used to build cloud specific cluster images for the specified cloud(s) (e.g. in system composition specification S 150).

In 518, the cloud specific cluster image may then sent to a corresponding cloud provider image registry for cloud provider 510 by pilot cluster 279. The image registry for cloud provider 510 may specific to the cloud provider 510. For example, an AMI may be created and stored in the Amazon Elastic Cloud (EC) registry. Each cloud provider may have a distinct cloud type with cloud-specific commands, APIs, storage, etc.

In 520, setup of cluster T1 may be initiated (e.g. by pilot cluster 279). For example, in some embodiments, lead node(s) $270_i^l$ for cluster T1 may be instantiated (e.g. based on the cloud specific images) by appropriate cloud specific commands/APIs for the cloud provider 510.

In 522, in response to the commands received in 520, cloud provider 510 may create lead node(s) $270_i^l$ for cluster T1 based on system composition specification S 150.

In 524, upon start up lead nodes $270_i^l$ for cluster T1 may obtain the cloud specific images and system composition specification S 150 from pilot cluster 279 and/or cloud provider 510.

In 526, lead nodes $270_i^l$ may initiate instantiation of worker nodes $270_i^k$, k≠l. In some embodiments, worker nodes $270_i^k$, k≠l may obtain cloud specific images and cloud specification 150 from lead node(s) $270_i^l$.

Accordingly cluster T1, which may be a cloud-based portion of a composable distributed system, may be composed and deployed in accordance with system composition specification S 150.

Figure 6:
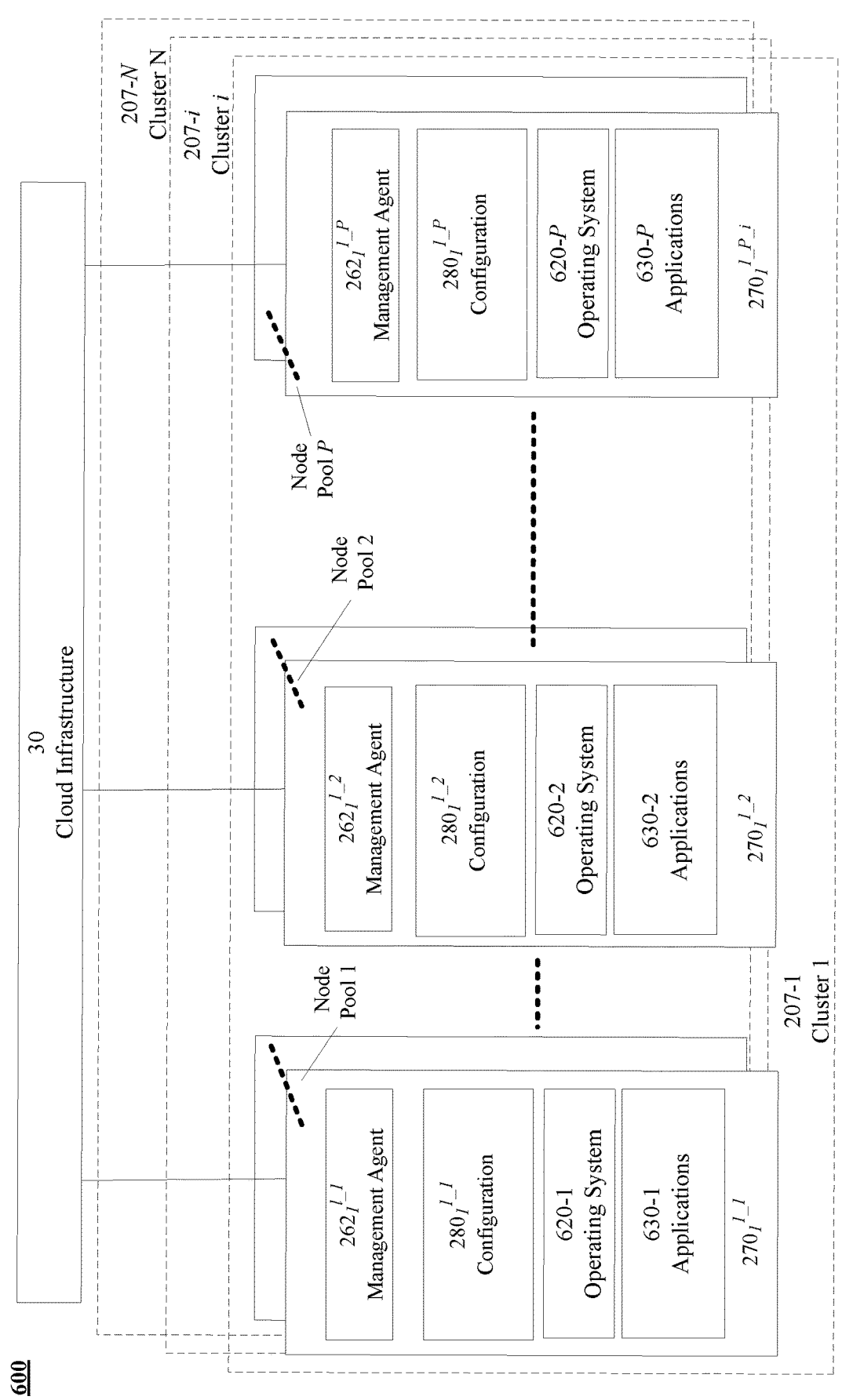
FIG. 6 shows an example architecture of a composable distributed system realized based on a system composition specification.

FIG. 6 shows an example architecture of a composable distributed system realized based on a system composition specification S 150. As outlined above, system composition specification S 150 may be expressed as S={$(C_i,B_i)|1 \le i \le N$}, where $C_i$ 180 is the cluster specification describing the configuration of the $i^{th}$ cluster. Cluster specification $C_i$ 180 for a cluster may include node pool specifications 180-k, where $1 \leq k \leq P$, where P is the number of node pools in the cluster. The number of node pools can vary between clusters. Cluster specification $C_i$ 180 may include various parameters (e.g. number of node pools k in cluster i, node count for each node pool k in cluster i, number of master or lead nodes in a master node pool and/or in cluster i, criteria for selection of master or lead nodes for a cluster and/or node pool, number of worker node pools in cluster i, node pool specifications 180-$k$, etc.), and $B_i$ is the cluster profile 104-$i$ associated with the $i^{th}$ cluster, and N is the number of clusters ($1 \leq i \leq N$) specified in the composable distributed system specification S. Thus, a composable distributed system may comprise a one or more clusters, where each cluster may comprise one or more node pools, and each node pool may comprise one or more nodes.

FIG. 6 shows that the distributed system as composed include clusters: Cluster 1 207-1 . . . Cluster-r 207-$r$ . . . and Cluster N. Each cluster 207-$i$ may be associated with a corresponding cluster specification $C_i$ 180-$i$ and cluster profile $B_i$ 104-$i$. Cluster specification $C_i$ 180-$i$ for Cluster i 207-$i$ may specify a number of node pools k and a number of nodes $W_i^k$ in each node pool k in cluster $C_i$ 180-$i$, so that for nodes $270_i^{w-k}$ in node pool k in Cluster i, $1 \leq w \leq W_i^k$, where $W_i^k$ is the number of nodes in node pool k in Cluster i 207-$i$. In some embodiments, nodes in a node pool k in a cluster 207 may be similarly configured (in the underlying hardware and/or software), while nodes in different node pools (and/or in different clusters) may have distinct configurations.

For example, as shown in FIG. 6, nodes $270_i^{w-1}$ in cluster 207-1 and node pool k=1 in cluster 207-1 may be similarly configured. For example, node pool k=1 in cluster 207-1 may comprise master or lead nodes, which may have some additional functionality enabled (e.g. related to functions that may be typically performed by lead nodes).

In some embodiments, at least one lead node $270_i^{l-k}$ may be specified for node pools k in a cluster 207-$i$. Depending on the associated cluster specification, lead nodes $270_i^{l-k}$ for a node pool k in cluster 207-$i$ may (or may not) form part of the associated node pools k. In some embodiments, node pools k in a cluster 207-$i$ may include lead node(s) $270_i^{l-k}$ and worker nodes $270_i^{w-k}$, $w \neq l$.

In some embodiments, each node 270 in anode pool/cluster may include a corresponding management agent 262, configuration engine 280, operating system 280, and applications 630. For example, node $270_i^{w-k}$, $1 \leq w \leq W_i^k$, $1 \leq k \leq P$, in node pool k in cluster 207-$i$ (with P node pools) may include a corresponding management agent $262_i^{w-k}$, configuration engine $280_i^{w-k}$, operating system 620-$k$, and applications 630-$k$. As outlined above, in some instances, nodes in a pool (or a cluster) may be configured similarly. Applications may include containers/containerized applications running on a node.

Thus, as shown in FIG. 6, a composable distributed system 600 may be built and deployed based on a system composition specification S 150, which may specify a composition of multiple clusters that comprise the composable distributed system 600. Further, one or more clusters, or node pools within a cluster) may be BM clusters. For example, a first BM cluster (e.g. Cluster 1) or BM node pool (e.g. Node Pool 1 within Cluster 1 207-1) may include graphics hardware (e.g. GPUs) on each node. A second BM cluster (e.g. Cluster 2) or BM node pool (e.g. Node Pool 2 within Cluster 1 207-2) may include TPUs. Further, Clusters 1 and Cluster 2 may be private clusters. Cluster 3 or node pool 3 (not shown in FIG. 6) in Cluster 1 207-1 may be a public cloud based cluster (e.g. AWS) associated with a first cloud provider (e.g. Amazon), while Cluster 4 or node pool P in cluster 1 207-1 may a second public cloud based cluster (e.g. Google cloud) associated with second cloud provider (e.g. Google). In addition, each cluster may use different software stacks (e.g. as specified by corresponding cluster profiles 104) even when the clusters use similar hardware.

Thus, composable distributed system may afford distributed system/application designers flexibility, the ability to customize clusters down to bare metal, and facilitate automatic system configuration. In addition, as outlined above, changes to the system composition specification may be automatically applied to bring the system composition and system state into compliance with the (changed) system composition specification. In addition, when system composition and/or system state deviates from the composition and state specified in the system composition specification (e.g. because of failures, errors, and/or malicious actors), the system composition and system state may be automatically brought into compliance with the system composition specification.

Figure 7A:
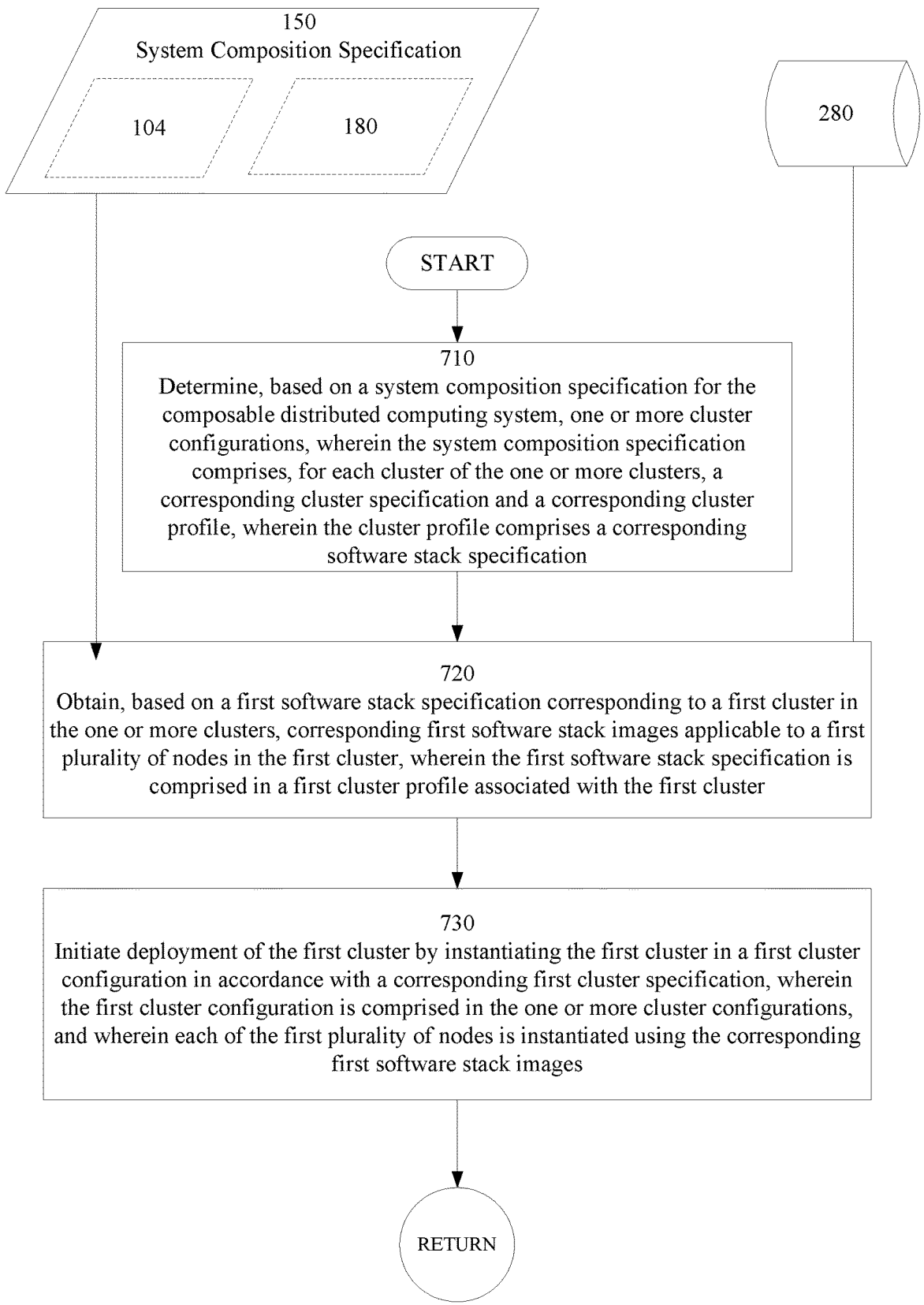
FIG. 7A shows a flowchart of a method to build and deploy a composable distributed computing system in accordance with some embodiments disclosed herein.

FIG. 7A shows a flowchart of a method 700 to build and deploy a composable distributed computing system in accordance with some embodiments disclosed herein. In some embodiments, method 700 may be performed in whole or in part, by DPE 202, and/or pilot cluster 279 and/or a node 270 and/or a host computer.

In some embodiments, in step 710 one or more cluster configurations ($Q=\{Q_i | 1 \leq Q_i \leq \_N\}$) may be determined based on a system composition specification S 150 ($S=\{(C_i, B_i) | 1 \leq i \leq N\}$) for the distributed computing system (D), wherein the system composition specification S 150 comprises for each cluster $T_i$ of the one or more clusters ($1 \leq T_i \leq N$), a corresponding cluster specification $C_i$ 180 and a corresponding cluster profile $B_i$ 104, which may comprise a corresponding software stack specification. In some embodiments, system composition specification S 150 may be specified declaratively.

Cluster configuration $Q_i$ for a cluster $T_i$ refers to a set of parameters such as one or more of: the number of nodes, physical including hardware characteristics of nodes, designation of lead and worker nodes, and/or other parameters such as number of node pools, node pool capabilities (e.g., capability to support GPU workloads, support Windows worker, SSD capabilities, capability to support TPU workloads, etc.), etc. that may be used to realize a cluster $T_i$ to be deployed on a distributed system D.

In embodiments where system composition specification S 150 is specified declaratively, cluster configuration for a cluster $T_i$ may include various other parameters and implementation details related to deployment that may not be explicitly specified in $C_i$. For example, system composition specification S 150 and/or cluster specification $C_i$ 180 may indicate that the cluster is to deployed on an Amazon AWS cloud, and the cloud credentials may be shared parameters among clusters $C_i$. Cluster configuration $Q_i$ may include implementation details and/or other parameters specific to cloud provider to deploy the cluster $T_i$ on AWS.

In some embodiments, in block 720, first software stack images ($M_1$) applicable to a first plurality of nodes $270_1^w$, in the first cluster $T_1$ of the one or more clusters may be obtained (e.g. from repository 280) based on a corresponding first software stack specification, where the first cluster profile $B_1$ for the first cluster $T_1$ may comprise the first software stack specification, and wherein the first cluster $C_1$ comprises a first plurality of nodes $270_1^w$ (where $1 \leq w \leq W_1$, and $W_1$ is the number of nodes in $T_1$).

In some embodiments, the first plurality of nodes may comprise one or more node pools k, where each node pool k may comprise a corresponding distinct subset $E_k$ of the first plurality of nodes $270_1^{w-k}$. In some embodiments, cluster specification $C_i$ 180 may comprise one or more node pool specifications 180-k, wherein each node pool specification 180-k corresponds to a node pool k.

In some embodiments, each subset $E_k$ corresponding to anode pool k may be disjoint from another node pool subset $E_u$ so that $E_k \cap E_u = \emptyset$, $k \neq u$. In some embodiments, at least one node pool (z) of the one or more node pools k may comprise bare metal (BM) nodes, wherein the capabilities (hardware and software) of the BM nodes in the at least one node pool are specified in system composition specification S 150. In some embodiments, the capabilities (hardware and software) of the BM nodes in the at least one node pool may be specified in at least one corresponding node pool specification (180-z). In some embodiments, the corresponding first software stack images ($M_1$) may comprise an operating system image for the BM nodes in the at least one node pool.

In some embodiments, the first plurality of nodes $270_1^k$, $w \leq W_1$, may comprise one or more bare metal nodes, wherein each bare metal node in the first plurality of nodes comprises hardware (e.g. GPU, CPU, TPU, SSD, etc.) specified in the corresponding first cluster specification $C_1$. In some embodiments, the one or more bare metal nodes may form one or more node pools in the first cluster $T_1$. In some embodiments, the corresponding first software stack images ($M_1$) may comprise an operating system image for each of the first plurality of BM nodes.

In some embodiments, the first plurality of nodes $270_1^w$ may comprise virtual machines associated with a cloud. In some embodiments, the corresponding first software stack images ($M_1$) may comprise an operating system image for each of the first plurality of nodes.

In some embodiments, in block 730, deployment of the first cluster $T_1$ may be initiated, wherein the first cluster $T_1$ is instantiated in a first cluster configuration $Q_1$ in accordance with a corresponding first cluster specification $C_1$, wherein each of the first plurality of nodes $270_1^k$, is instantiated using the corresponding first software stack images ($M_1$). The first cluster configuration may be comprised in the one or more cluster configurations ($Q_1 \in Q$). Thus, method 700 may be used to compose and automatically deploy a distributed system D based on the system composition specification S 150.

In some embodiments, the one or more cluster configurations $Q_i$, $1 \leq i \leq N$ may be each be distinct in terms of the physical node characteristics and/or the software stack associated with nodes. For example, the one or more cluster configurations $Q_i$, $1 \leq i \leq N$ (e.g. in block 710 above) may include at least one of: (i) a corresponding private cloud configuration (e.g. $Q_{i=x}$) comprising a plurality of bare metal nodes with hardware characteristics indicated by the corresponding cluster specification $C_{i=x}$ and corresponding software stack images ($M_{i=x}$) obtained from the corresponding software stack specification comprised in a corresponding cluster profile $B_{i=x}$, (e.g. for a cluster $T_{i=x}$); or (ii) a corresponding private cloud configuration (e.g. $Q_{i=y}$) comprising a plurality of virtual machine nodes with corresponding software stack images (e.g. for a cluster $T_{i=y}$); or (iii) a corresponding public cloud configuration (e.g. $Q_{i=z}$) comprising a plurality of virtual machine nodes, or (d) a combination thereof. Thus, for example, the first cluster configuration $Q_1$ may be one of (i) through (iii) above.

Further, in some embodiments, the one or more cluster configurations $Q_i$, $1 \leq i \leq N$ may each (optionally) include one or more node pools. which may be associated with corresponding cluster sub-profiles. For example, a first cluster configuration $Q_{i=1}$ may include one or more node pools, where: (i) a first node pool may comprise a plurality of bare metal nodes with hardware characteristics indicated by the corresponding cluster specification and corresponding software stack images obtained, at least in part, from the corresponding software stack specification specified in a corresponding first cluster sub-profile; (ii) a second node pool may comprise a corresponding private cloud configuration comprising a plurality of virtual machine nodes with corresponding software stack images obtained, at least in part, from the corresponding software stack specification specified in a corresponding second cluster sub-profile, while (iii) a third node pool may comprise a corresponding public cloud configuration comprising a plurality of virtual machine nodes with corresponding software stack images obtained, at least in part, from the corresponding software stack specification specified in a corresponding third cluster sub-profile. In some embodiments, the first, second, and third node pools may also include software stack images obtained, in part, from a software stack specification comprised in a cluster-wide sub-profile.

In some embodiments, the first plurality of nodes may form a node pool, wherein the node pool may form part of: a first private cloud configuration comprising a plurality of bare metal nodes with hardware characteristics specified in the corresponding first cluster specification, or a second private cloud configuration comprising a first plurality of virtual machine nodes, or a public cloud configuration comprising a second plurality of virtual machine nodes.

Figure 7B:
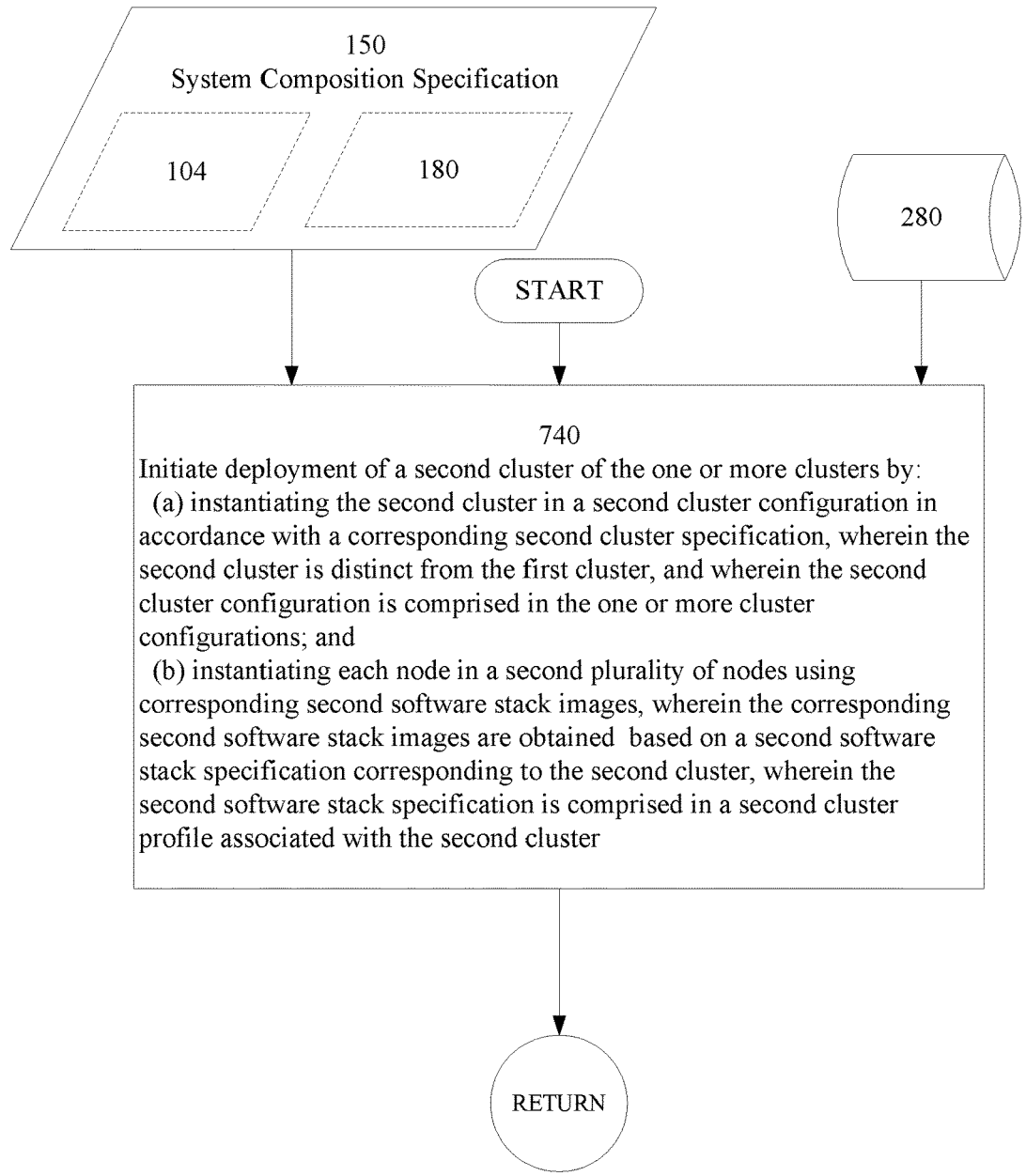
FIG. 7B shows a flowchart of a method to build and deploy additional clusters in a composable distributed computing system in accordance with some embodiments disclosed herein.

FIG. 7B shows a flowchart of a method 735 to build and deploy additional clusters in a composable distributed computing system in accordance with some embodiments disclosed herein. In some embodiments, method 735 may be performed in whole or in part, by DPE 202, and/or pilot cluster 279 and/or a node 270 and/or a host computer. In some embodiments, method 735 may be performed as an additional step of method 700.

In some embodiments, in block 740, a second cluster $T_2$ of the one or more clusters $T_i$ may be deployed, wherein the second cluster is distinct from the first cluster ($T_2 \neq T_1$), and wherein the second cluster $T_2$ may be deployed by instantiating: (a) a second cluster configuration $Q_2$ in accordance with a corresponding second cluster specification $C_2$ (e.g. comprised in $C_i$ 180), and (b) each node in a second plurality of nodes using corresponding second software stack images $M_2$ (e.g. obtained from repository 280), wherein the corresponding second software stack images ($M_2$) are obtained based on a second software stack specification corresponding to the second cluster $T_2$, wherein second software stack specification is comprised in a second cluster profile $B_2$ (e.g. obtained from $B_i$ 104) for the corresponding second cluster $T_2$. In some embodiments, the second cluster configuration and/or the second plurality of nodes may include one or more node pools.

Figure 7C:
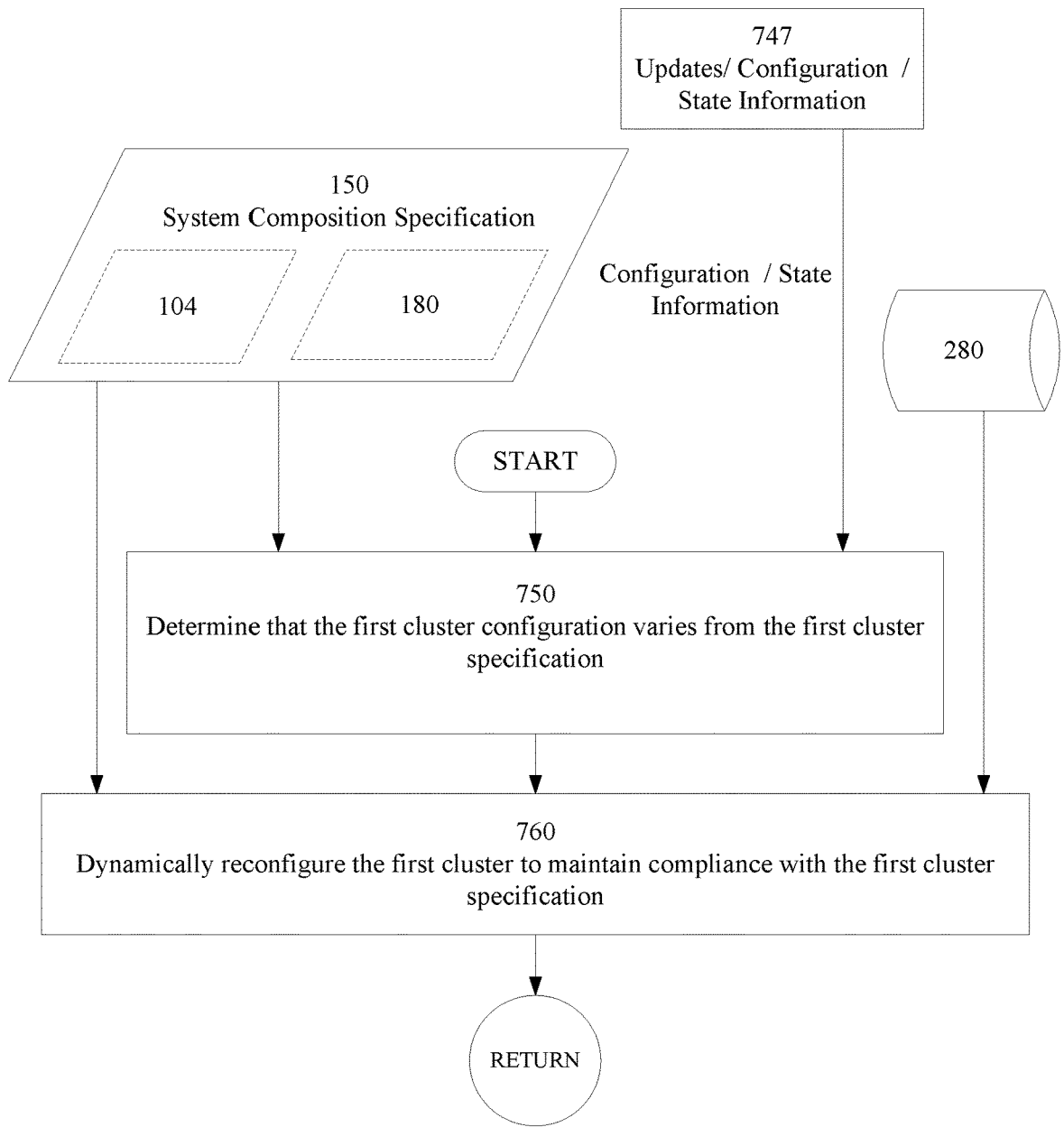
FIG. 7C shows a flowchart of a method to maintain and reconcile a configuration and/or state of composable distributed computing system D with system composition specification S 150.

FIG. 7C shows a flowchart of a method 745 to maintain and reconcile a configuration and/or state of composable distributed computing system D with system composition specification S 150. In some embodiments, method 745 may be performed in whole or in part, by DPE 202, and/or pilot cluster 279 and/or a node 270 and/or a host computer. In some embodiments, method 745 may be performed as an additional step of method 700.

In block 750, it may be determined (e.g. based on updates/configuration/state information 747 from a lead node $270_1^l$ and/or a management agent 262 and/or DPE 202) that the first cluster configuration $Q_1$ varies from the first cluster specification $C_1$. The first cluster configuration $Q_1$ may vary from the first cluster specification $C_1$ on account of: (a) updates to system composition specification S 150 that pertain to the first cluster $T_1$ (e.g. changes to $C_1$ or $B_1$; or (b) errors, failures, or other events that result in changes to the operational configuration and/or state of the deployed first cluster $T_1$ (e.g. which may occur without changes to system composition specification S 150).

Figure 7D:
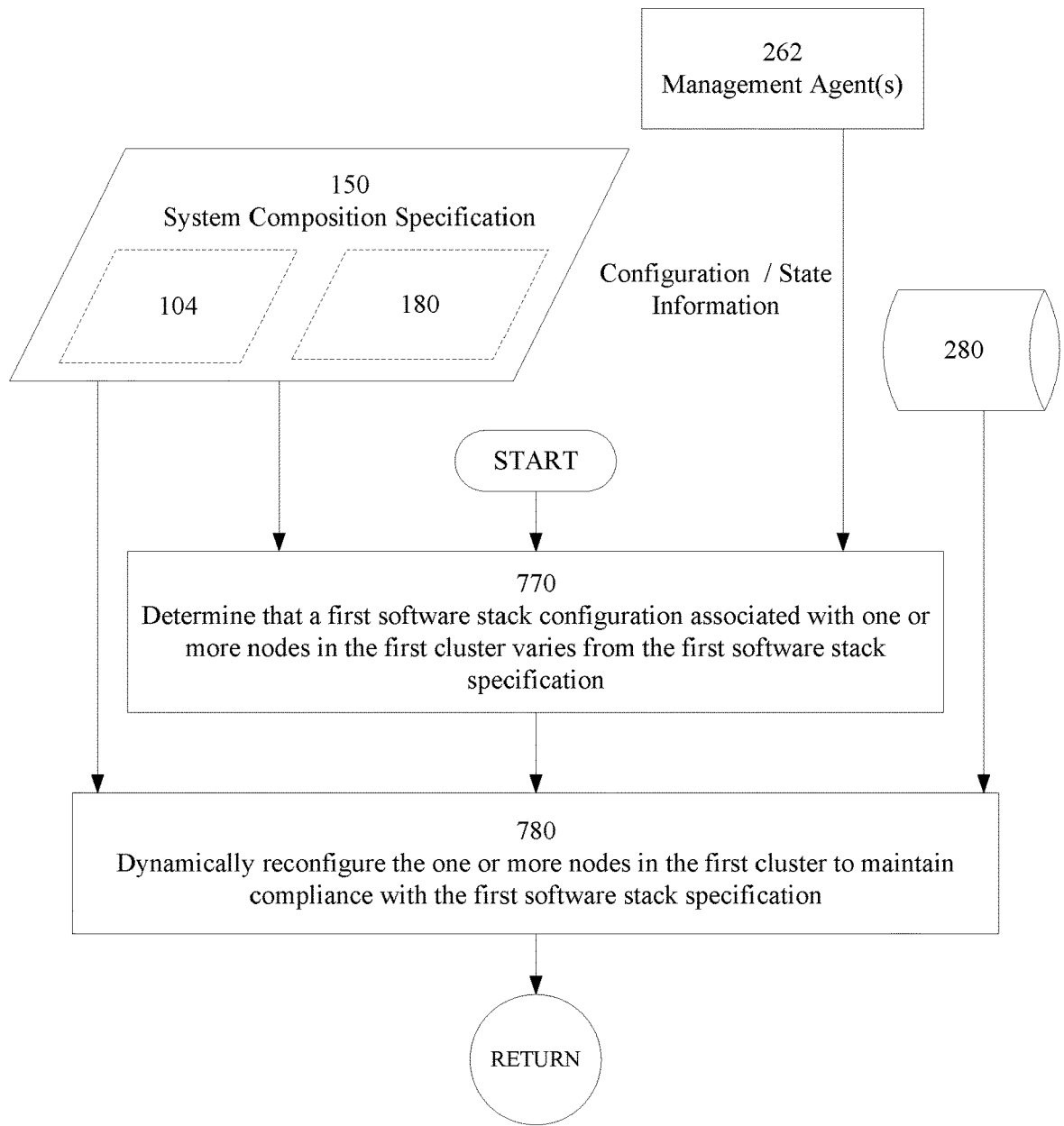
FIG. 7D shows a flowchart of a method to maintain and reconcile a configuration and/or state of composable distributed computing system D with system composition specification.

In block 760, the first cluster $T_1$ may be dynamically reconfigured to maintain compliance with the first cluster specification. The term dynamic is used to refer to cluster configuration changes that are effected during operation of the first cluster $T_1$. In some embodiments, the configuration changes may be rolled out at in accordance with user-specified parameters (e.g. immediate, at specified intervals, upon occurrence of specified events, etc.). In some embodiments, the dynamic reconfiguration of the first cluster $T_1$ may be performed in response to at least one of: (i) a change to the first cluster specification $C_1$ during operation or during deployment of the first cluster; or (ii) changes to the composition (e.g. node/VM failures or errors) or state of the first cluster $T_1$ that occur during operation of the first cluster or during deployment of the first cluster; or (iii) a combination thereof. Both (i) and (ii) above may result in the cluster being non-compliant with the corresponding first cluster specification $C_1$ FIG. 7D shows a flowchart of a method 765 to maintain and reconcile a configuration and/or state of composable distributed computing system D with system composition specification S 150. In some embodiments, method 765 may be performed in whole or in part, by DPE 202, and/or pilot cluster 279 and/or a node 270 and/or a host computer. In some embodiments, method 765 may be performed as an additional step of method 700 and/or in parallel with method 745.

In block 770, it may be determined (e.g. based on updates/configuration/state information 747 from a lead node $270_1^l$ and/or a management agent 262 and/or DPE 202) that a first software stack configuration associated with one or more nodes in the first cluster varies from the first software stack specification.

The first software stack configuration may vary from the first software stack specification $B_1$ on account of: (a) updates to system composition specification S 150 that pertain to the first cluster $T_1$ (e.g. changes to $B_1$); or (b) errors, failures, or other events that result in changes to the operational configuration and/or state of the deployed software stack (e.g. which may occur without changes to system composition specification S 150); and (c) updates to images (e.g. in repository 280) based on parameters in first software stack specification $B_1$.

For example, cluster profile $B_1$ 104-1 may indicate that: (a) a latest release of some component of the first software stack is to be used; or (b) the most recent major version of some component of the first software stack is to be used; or (c) the most recent minor version of some component of the first software stack is to be used; or (d) the most recent stable version of some component of the first software stack is to be used; or (e) some other parameter determining when some component of the first software stack is to be used, or (f) some combination of the above parameters. When $B_1$ 104-1 indicates one of (a)-(f) above, and an event that satisfies one of the above parameters occurs (e.g. update to Kubernetes from release 1.16 to 1.17 and $B_1$ 104-1 indicates the latest release is to be used), then, the state of the first cluster $T_1$ may be determined to be non-compliant with first software stack specification as specified by cluster profile $B_1$ 104-1 (e.g. based on a comparison of the current state/configuration with $B_1$ 104-1). For example, when a new release is downloaded and/or a new image of a software component is stored in repository 280, then, the state of the first cluster $T_1$ may be determined to non-compliant with first software stack specification as specified by cluster profile $B_1$ 104-1

In block 780, one or more nodes in the first cluster $T_1$ may be dynamically reconfigured to maintain compliance with the first software stack specification $B_1$ 104-1. For example, cluster $T_1$ may be dynamically reconfigured with the latest release (e.g. Kubernetes 1.17) of the software component (when indicated in $B_1$ 104-1). As another example, labels such as "Latest," or "Stable" may automatically result in cluster $T_1$ being dynamically reconfigured with the latest version or the last known stable version of one or more components of the first software stack. In some embodiments, the dynamic reconfiguration of the one or more nodes in the first cluster $T_1$ may be performed in response to at least one of: (a) a change to the first software stack specification during operation or deployment of the first cluster; or (b) changes to the first software stack configuration on the one or more nodes in the first cluster that occur during operation of the first cluster or during deployment of the first cluster (e.g. errors, failures, etc. which may occur without changes to $B_1$ 104-1); or a combination thereof.

Thus, the variation of the first software stack configuration associated with the one or more nodes in the first cluster from the first software stack specification may occurs due to (a) updates to one or more components identified in the first software stack specification $B_1$ 104-1, wherein first software stack specification $B_1$ 104-1 includes an indication that the one or more components are to be updated based on corresponding parameters (e.g. update to latest, update to last known stable version, update on major release, update on minor release, etc.) associated with the one or more components.

In some embodiments, the methods and modules described herein may be implemented using a variety of wired and/or wirelessly networked processors, various computers, and computing devices, including mobile devices such as smartphones, notebooks, and handheld computers, and various distributed computing systems including clouds—including private clouds, public clouds, and/or hybrid private public clouds. For example, one or more node pools or clusters, which may include BM nodes, may be deployed (based on a system composition specification S 150) on one or more private clouds, while other node pools or clusters, which may include VM nodes, may be deployed on one or more public clouds. In some embodiments, the method and modules described herein may be embodied in computer-readable media, including magnetic and/or optical media and various types of non-volatile memory and/or media.

Other embodiments will be apparent to those skilled in the art from consideration of the specification and practice of one or more embodiments of the disclosed herein. It is intended that the specification and examples be considered as exemplary only, with a true scope and spirit of the invention being indicated by the following claims.

What is claimed is:

1. A processor-implemented method to realize a composable distributed computing system comprising one or more clusters, the method comprising:
   determining, based on a system composition specification for the composable distributed computing system, one or more cluster configurations, wherein the system composition specification comprises, for each cluster of the one or more clusters, a corresponding cluster specification and a corresponding cluster profile, wherein each cluster profile comprises a corresponding software stack specification;

obtaining, based on a first software stack specification corresponding to a first cluster in the one or more clusters, corresponding first software stack images applicable to a first plurality of nodes in the first cluster, wherein the first software stack specification is comprised in a first cluster profile associated with the first cluster;

initiating deployment of the first cluster by instantiating the first cluster in a first cluster configuration in accordance with a corresponding first cluster specification, wherein the first cluster configuration is comprised in the one or more cluster configurations, and wherein each of the first plurality of nodes is instantiated using the corresponding first software stack images;

determining, subsequent to deployment of the first cluster, that the first cluster configuration during runtime varies from the corresponding first cluster specification; and dynamically reconfiguring the first cluster during runtime to maintain compliance with the corresponding first cluster specification.

2. The method of claim 1, wherein the first plurality of nodes comprise bare metal nodes, wherein each of the one or more bare metal nodes comprises hardware specified in the corresponding first cluster specification.

3. The method of claim 1, wherein the first plurality of nodes comprise one or more virtual machines associated with a cloud.

4. The method of claim 1, wherein the corresponding first software stack images, comprise an operating system image for one or more nodes in the first plurality of nodes.

5. The method of claim 1, wherein the corresponding first software stack images are dynamically determined at a time when deployment of the first cluster is initiated based on one or more parameters specified in the first cluster profile.

6. The method of claim 1, wherein the system composition specification is declarative.

7. The method of claim 1, further comprising initiating deployment of a second cluster of the one or more clusters by:

instantiating the second cluster in a second cluster configuration in accordance with a corresponding second cluster specification, wherein the second cluster is distinct from the first cluster, and wherein the second cluster configuration is comprised in the one or more cluster configurations; and instantiating each node in a second plurality of nodes using corresponding second software stack images, wherein the corresponding second software stack images are obtained based on a second software stack specification corresponding to the second cluster, wherein the second software stack specification is comprised in a second cluster profile associated with the second cluster.

8. The method of claim 1, wherein the first plurality of nodes form a node pool, wherein the node pool forms part of:

a first private cloud configuration comprising a plurality of bare metal nodes with hardware characteristics specified in the corresponding first cluster specification, or a second private cloud configuration comprising a first plurality of virtual machine nodes, or a public cloud configuration comprising a second plurality of virtual machine nodes.

9. The method of claim 1, wherein the dynamic reconfiguration of the first cluster is performed in response to at least one of:

a change to the corresponding first cluster specification that occurs during operation of the first cluster, or subsequent to deployment of the first cluster; or a change to the first cluster configuration that occurs during operation of the first cluster; or a combination thereof.

10. The method of claim 1, further comprising:

determining, subsequent to deployment of the first cluster, that a first software stack configuration during runtime associated with one or more nodes in the first cluster varies from the first software stack specification; and dynamically reconfiguring the one or more nodes in the first cluster during runtime to maintain compliance with the first software stack specification.

11. The method of claim 10, wherein the dynamic reconfiguration of the one or more nodes in the first cluster is performed in response to at least one of:

a change to the first software stack specification that occurs during operation of the first cluster, or subsequent to deployment of the first cluster; or a change to the first software stack configuration on the one or more nodes in the first cluster that occurs during operation of the first cluster; or a combination thereof.

12. The method of claim 10, wherein the variation of the first software stack configuration from the first software stack specification occurs due to dynamically determined updates to one or more components of the first software stack specification, wherein the updates are dynamically determined are based on one or more parameters specified in the first cluster profile.

13. The method of claim 1, wherein the determination that the first cluster configuration during runtime varies from the corresponding first cluster specification is determined locally by: an agent running locally on the first cluster or, by a node local to the first cluster, or a combination thereof.

14. The method of claim 1, wherein the dynamic reconfiguration of the first cluster during runtime to maintain compliance with the corresponding first cluster specification is performed locally by: an agent running locally on the first cluster or, a node local to the first cluster, or a combination thereof.

15. The method of claim 1, wherein the dynamic reconfiguration of the first cluster during runtime to maintain compliance with the corresponding first cluster specification is performed based on at least one dynamic versioning label for a corresponding first software stack configuration and without a change to the system composition specification.

16. A system comprising at least one processor coupled to a memory and a network interface, wherein the processor is configured to:

determine, based on a system composition specification for a composable distributed computing system, one or more cluster configurations, wherein the system composition specification comprises, for each cluster of one or more clusters, a corresponding cluster specification and a corresponding cluster profile, wherein each cluster profile comprises a corresponding software stack specification;

obtain, based on a first software stack specification corresponding to a first cluster in the one or more clusters, corresponding first software stack images applicable to a first plurality of nodes in the first cluster, wherein the first software stack specification is comprised in a first cluster profile associated with the first cluster;

initiate deployment of the first cluster by instantiating the first cluster in a first cluster configuration in accordance with a corresponding first cluster specification, wherein the first cluster configuration is comprised in the one or more cluster configurations, and wherein each of the first plurality of nodes is instantiated using the corresponding first software stack images;

determine, subsequent to deployment of the first cluster, that the first cluster configuration during runtime varies from the corresponding first cluster specification; and dynamically reconfigure the first cluster during runtime to maintain compliance with the corresponding first cluster specification.

17. The system of claim 16, wherein the first plurality of nodes comprise bare metal nodes, wherein each of the one or more bare metal nodes comprises hardware specified in the corresponding first cluster specification.

18. The system of claim 16, wherein the corresponding first software stack images, comprise an operating system image for one or more nodes in the first plurality of nodes.

19. The system of claim 16, wherein the corresponding first software stack images are dynamically determined at a time when deployment of the first cluster is initiated based on one or more parameters specified in the first cluster profile.

20. The system of claim 16, wherein the system composition specification is declarative.

21. The method of claim 16, wherein the dynamic reconfiguration of the first cluster is performed in response to at least one of:
a change to the corresponding first cluster specification that occurs during operation of the first cluster, or subsequent to deployment of the first cluster; or
a change to the first cluster configuration that occurs during operation of the first cluster; or
a combination thereof.

22. The system of claim 16, wherein the processor is further configured to:
determine, subsequent to deployment of the first cluster, that a first software stack configuration during runtime associated with one or more nodes in the first cluster varies from the first software stack specification; and
dynamically reconfigure the one or more nodes in the first cluster during runtime to maintain compliance with the first software stack specification.

23. The system of claim 22, wherein the dynamic reconfiguration of the one or more nodes in the first cluster is performed in response to at least one of:
a change to the first software stack specification that occurs during operation of the first cluster, or subsequent to deployment of the first cluster; or
a change to the first software stack configuration on the one or more nodes in the first cluster that occurs during operation of the first cluster; or
a combination thereof.

24. The system of claim 22, wherein the variation of the first software stack configuration from the first software stack specification occurs due to dynamically determined updates to one or more components of the first software stack specification, wherein the updates are dynamically determined are based on one or more parameters specified in the first cluster profile.

25. A non-transitory computer-readable medium comprising instructions to configure a processor to:
determine, based on a system composition specification for a composable distributed computing system, one or more cluster configurations, wherein the system composition specification comprises, for each cluster of one or more clusters, a corresponding cluster specification and a corresponding cluster profile, wherein each cluster profile comprises a corresponding software stack specification;

obtain, based on a first software stack specification corresponding to a first cluster in the one or more clusters, corresponding first software stack images applicable to a first plurality of nodes in the first cluster, wherein the first software stack specification is comprised in a first cluster profile associated with the first cluster;

initiate deployment of the first cluster by instantiating the first cluster in a first cluster configuration in accordance with a corresponding first cluster specification, wherein the first cluster configuration is comprised in the one or more cluster configurations, and wherein each of the first plurality of nodes is instantiated using the corresponding first software stack images;

determine, subsequent to deployment of the first cluster, that the first cluster configuration during runtime varies from the corresponding first cluster specification; and dynamically reconfigure the first cluster during runtime to maintain compliance with the corresponding first cluster specification.

\* \* \* \* \*